US 12,081,028 B2

(12) United States Patent
Hamaguchi et al.

(10) Patent No.: US 12,081,028 B2
(45) Date of Patent: Sep. 3, 2024

(54) POWER ADJUSTMENT METHOD AND POWER ADJUSTMENT DEVICE

(71) Applicant: IHI Corporation, Tokyo (JP)

(72) Inventors: Kenichi Hamaguchi, Koto-ku (JP); Akinobu Inamura, Koto-ku (JP); Yuji Koguma, Koto-ku (JP)

(73) Assignee: IHI Corporation, Tokyo (JP)

( * ) Notice: Subject to any disclaimer, the term of this patent is extended or adjusted under 35 U.S.C. 154(b) by 2 days.

(21) Appl. No.: 18/006,680

(22) PCT Filed: Jul. 28, 2021

(86) PCT No.: PCT/JP2021/027922
§ 371 (c)(1),
(2) Date: Jan. 24, 2023

(87) PCT Pub. No.: WO2022/054441
PCT Pub. Date: Mar. 17, 2022

(65) Prior Publication Data
US 2023/0283078 A1    Sep. 7, 2023

(30) Foreign Application Priority Data

Sep. 11, 2020 (JP) ................................. 2020-153216

(51) Int. Cl.
*H02J 3/38* (2006.01)
*H02J 3/32* (2006.01)
(Continued)

(52) U.S. Cl.
CPC ........ *H02J 3/32* (2013.01); *H02J 3/38* (2013.01); *H02J 7/35* (2013.01); *H02J 15/008* (2020.01); *H02J 2300/24* (2020.01)

(58) Field of Classification Search
CPC ........ H02J 3/14; H02J 3/28; H02J 3/32; H02J 3/38; H02J 3/381; H02J 7/34; H02J 7/35; H02J 15/008; H02J 2300/24
See application file for complete search history.

(56) References Cited

U.S. PATENT DOCUMENTS

2014/0362623 A1* 12/2014 Farkas .................... H02J 3/381
                                                                                    363/97
2020/0176989 A1   6/2020 Zhang et al.
2021/0305606 A1   9/2021 Murai et al.

FOREIGN PATENT DOCUMENTS

JP      2006-333563 A    12/2006
JP      2010-22101 A      1/2010
(Continued)

OTHER PUBLICATIONS

International Search Report issued Sep. 28, 2021 in PCT/JP2021/027922 filed Jul. 28, 2021, 2 pages.
(Continued)

*Primary Examiner* — Levi Gannon
(74) *Attorney, Agent, or Firm* — Oblon, McClelland, Maier & Neustadt, L.L.P.

(57) ABSTRACT

A power adjustment method includes a step of calculating an integration error which is an error between a control target value of an integrated amount of grid power transmitted and received between an electric power system and a microgrid and an actual value of the integrated amount of the grid power, a step of generating a first command value for causing a power consuming device to consume power consumption on the basis of a low-frequency component of the integration error, a step of generating a second command value for causing a power storage device to charge and discharge charging/discharging power on the basis of a high-frequency component of the integration error, and a step of outputting the first command value to the power (Continued)

consuming device and outputting the second command value to the power storage device.

10 Claims, 22 Drawing Sheets

(51) Int. Cl.
   *H02J 7/35*      (2006.01)
   *H02J 15/00*     (2006.01)

(56) References Cited

FOREIGN PATENT DOCUMENTS

| JP | 6208614 B2 | 10/2017 |
| JP | 2018-85861 A | 5/2018 |
| JP | 2020-54085 A | 4/2020 |
| WO | WO 2016/143239 A1 | 9/2016 |
| WO | WO 2020/121436 A1 | 6/2020 |

OTHER PUBLICATIONS

"Environmental Improvements for Ensuring Balance of Efficient and Stable Energy Supply and Demand", Agency for Natural Resources and Energy, https://www.meti.go.jp/shinglkai/enecho/denryoku_gas/denryoku_gas/pdf/180312_2.pdf, 2018, (with Partial English Translation), 6 pages.

\* cited by examiner

POWER ADJUSTMENT METHOD AND POWER ADJUSTMENT DEVICE

TECHNICAL FIELD

The present disclosure relates to a power adjustment method, and a power adjustment device.

BACKGROUND ART

A planned value balancing system is introduced as a mechanism for securing balance between the demand and supply of electric power. Under the planned value balancing system, a difference (imbalance) between a plan submitted by a power generation company before supply and the actual power generation and a difference (imbalance) between a plan submitted by a retailer before demand and the actual demand results are adjusted by the general power transmission company using adjustable power supply. On the other hand, the costs of adjustment performed by the general power transmission company are recovered through imbalance charges based on market prices on wholesale power exchanges. Control for zeroing or reducing the imbalance for the planned value balancing system is referred to as planned value balancing control or imbalance avoidance control.

Patent Literature 1 discloses a system that manages the operations of a photovoltaic power generation system, a hydrogen production and storage system, a storage battery system, and a fuel cell system. The system disclosed in Patent Literature 1 increases the amount of charging of a rechargeable battery when the actual value of surplus power exceeds the predicted value of surplus power and the charging rate of a storage battery does not exceed the setting value. On the other hand, the system disclosed in Patent Literature 1 increases the amount of production and storage of hydrogen when the actual value of surplus power exceeds the predicted value of surplus power and the charging rate of the storage battery exceeds the setting value.

CITATION LIST

Patent Literature

[Patent Literature 1] Japanese Unexamined Patent Publication No. 2020-54085

SUMMARY OF INVENTION

Technical Problem

In the system disclosed in Patent Literature 1, the hydrogen production and storage system is brought into operation when the charging rate of the storage battery exceeds the setting value. However, generally, the response speed of a power consuming device such as the hydrogen production and storage system is slower than the response speed of a power storage device such as the storage battery. Therefore, the power consuming device such as the hydrogen production and storage system cannot absorb a sudden fluctuation in power such as renewable energy power generation. As a result, there is concern of the imbalance not being able to be avoided.

The present disclosure describes a power adjustment method and a power adjustment device that make it possible to improve the performance of planned value balancing control.

Solution to Problem

According to an aspect of the present disclosure, there is provided a power adjustment method of controlling power consumption of a power consuming device and charging/discharging power of a power storage device included in a microgrid capable of transmitting and receiving power to and from an external electric power system. The power adjustment method includes a step of calculating an integration error which is an error between a control target value of an integrated amount of grid power transmitted and received between the electric power system and the microgrid and an actual value of the integrated amount of the grid power, a step of generating a first command value for causing the power consuming device to consume the power on the basis of a low-frequency component of the integration error, a step of generating a second command value for causing the power storage device to charge and discharge the charging/discharging power on the basis of a high-frequency component of the integration error, and a step of outputting the first command value to the power consuming device and outputting the second command value to the power storage device.

Effects of Invention

The power adjustment method and the power adjustment device of the present disclosure make it possible to improve the performance of planned value balancing control.

DESCRIPTION OF EMBODIMENTS

[1] Outline of Embodiment

Figure 1:
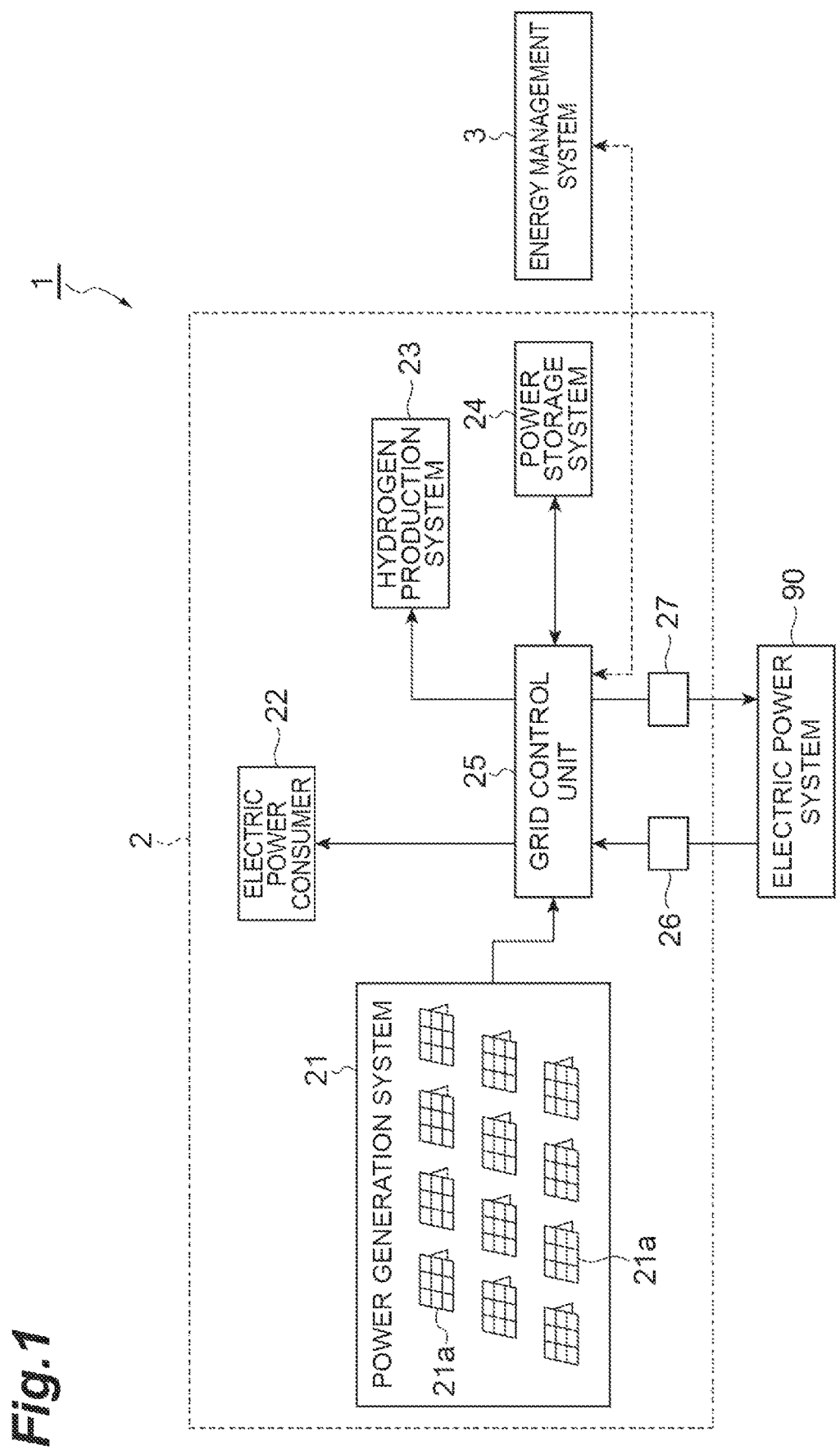
FIG. 1 is a diagram illustrating a schematic configuration of a power supply system including an energy management system of the present disclosure.

A power adjustment method according to an aspect of the present disclosure controls power consumption of a power consuming device and charging/discharging power of a power storage device included in a microgrid capable of transmitting and receiving electric power to and from an external electric power system. The power adjustment method includes a step of calculating an integration error which is an error between a control target value of an integrated amount of grid power transmitted and received between the electric power system and the microgrid and an actual value of the integrated amount of the grid power, a step of generating a first command value for causing the power consuming device to consume the power on the basis of a low-frequency component of the integration error, a step of generating a second command value for causing the power storage device to charge and discharge the charging/discharging power on the basis of a high-frequency component of the integration error, and a step of outputting the first command value to the power consuming device and outputting the second command value to the power storage device.

According to another aspect of the present disclosure, there is provided a power adjustment device configured to control power consumption of a power consuming device and charging/discharging power of a power storage device included in a microgrid capable of transmitting and receiving power to and from an external electric power system. The power adjustment device includes at least one processor. The at least one processor calculates an integration error which is an error between a control target value of an integrated amount of grid power transmitted and received between the electric power system and the microgrid and an actual value of the integrated amount of the grid power, generates a first command value for causing the power consuming device to consume the power on the basis of a low-frequency component of the integration error, generates a second command value for causing the power storage device to charge and discharge the charging/discharging power on the basis of a high-frequency component of the integration error, and outputs the first command value to the power consuming device and outputs the second command value to the power storage device.

According to the power adjustment method and the power adjustment device, the first command value is generated on the basis of the low-frequency component of the integration error. According to the power adjustment method and the power adjustment device, the second command value is generated on the basis of the high-frequency component off the integration error. According to the power adjustment method and the power adjustment device, the first command value is output to the power consuming device. According to the power adjustment method and the power adjustment device, the second command value is output to the power storage device. Generally, a response time after the power consuming device such as a water electrolyzer receives the first command value until it consumes the power is longer than a response time after the power storage device receives the second command value and before it charges and discharges the charging/discharging power. The low-frequency component of the integration error fluctuates in the long term. That is, a high-speed response is not required. On the other hand, the high-frequency component of the integration error fluctuates in the short term. That is, a high-speed response is required. Therefore, the power consuming device copes with a short-term fluctuation by generating the first command value on the basis of the low-frequency component of the integration error. The power consuming device generates the second command value on the basis of the high-frequency component of integration error, so that the power storage device copes with a short-term fluctuation. With such a configuration, it is possible to follow a fluctuation in the integration error. As a result, it is possible to improve the performance of planned value balancing control.

The step of calculating an integration error may include a step of calculating an error between a power target value of the grid power and a measured value of the grid power and a step of calculating the integration error by integrating the error. In this case, the integration error can be calculated using a simple calculation of integrating the error between the power target value of the grid power and the measured value of the grid power.

The step of calculating an integration error may include a step of calculating the actual value by integrating a measured value of the grid power and a step of calculating the integration error by calculating a difference between the control target value and the actual value. In this case, the integration error can be calculated simply by calculating the difference between the control target value and the integrated value of the measured value of the grid power.

The step of generating a second command value may include generating the second command value on the basis of an error between a target value of a remaining amount of the power storage device and the remaining amount, and the high-frequency component. In this case, it is possible to control the charging/discharging power of the power storage device so that the remaining amount of the power storage device does not deviate considerably from the target value of the remaining amount of the power storage device. Therefore, it is possible to reduce a possibility of the power storage device being in a fully charged state or an over-discharged state. As a result, it is possible to further improve the performance of the planned value balancing control.

The control target value may increase at a constant rate as time passes in a time interval. In this case, it is possible to easily set the control target value. As a result, it is possible to reduce a calculation load.

A rate of increase in the control target value may change continuously from a previous time interval. In this case, since the continuity of control is maintained, it is possible to improve the stability of control. As a result, it is possible to improve the performance of the planned value balancing control.

The above power adjustment method may further include a step of, in a case where the first command value is outside a range determined in advance, changing the first command value so as to fall within the range and adding a difference before and after the change to the second command value. For example, the power consuming device may not have a discharging capability. There may also be an upper limit on the power that can be consumed by the power consuming device. In a case where the power to be consumed by the power consuming device according to the first command value is outside the range of power that can be consumed by the power consuming device, target power consumption cannot be obtained. Therefore, the first command value is changed so that the power to be consumed by the power consuming device according to the first command value falls within the range of power that can be consumed by the power consuming device. As a result, it is possible to obtain the target power consumption. A difference before and after the change is added to the second command value. As a result, it is possible to cause the power storage device to cope with the amount of power with which the power consuming device cannot cope.

The above power adjustment method may further include a step of generating a third command value on the basis of the integration error. The step of generating a first command value may include generating the first command value on the basis of a low-frequency component of the third command value. The step of generating a second command value may include generating the second command value on the basis of a high-frequency component of the third command value. In this case, the integration error is converted into the third command value, and then the first command value and the second command value are generated. Therefore, it is possible to simplify calculation compared with a configuration in which the low-frequency component of the integration error is converted into the first command value and then the high-frequency component of the integration error is converted into the second command value.

[2] Illustration of Embodiment

Hereinafter, a power adjustment method and a power adjustment device of the present disclosure will be described in detail with reference to the accompanying drawings. Meanwhile, in the description of the drawings, the same components are denoted by the same reference numerals and signs, and thus description thereof will not be repeated.

FIG. 1 is a diagram illustrating a schematic configuration of a power supply system including an energy management system of the present disclosure. A power supply system 1 shown in FIG. 1 includes a microgrid 2 and an energy management system 3 (power adjustment device).

The microgrid 2 is connected to an external electric power system (commercial system) 90. The microgrid 2 is a system capable of receiving power from the electric power system 90 and transmitting power to the electric power system 90. Electric power which is transmitted and received between the microgrid 2 and the electric power system 90 is referred to as grid power. In a case where the grid power has a positive value, the microgrid 2 receives power from the electric power system 90. In a case where the grid power has a negative value, the microgrid 2 transmits power to the electric power system 90. The microgrid 2 includes a power generation system 21, an electric power consumer 22, a hydrogen production system 23 (power consuming device), a power storage system 24 (power storage device), a grid control unit 25, a power measurement unit 26, and a power measurement unit 27.

The power generation system 21 performs power generation using renewable energy. In the present disclosure, the power generation system 21 is a photovoltaic (PV) power generation system. The power generation system 21 includes a photovoltaic panel 21a and a power conditioning system (PCS). The power conditioning system which is a power conversion device converts electric power generated by the photovoltaic panel 21a. The power conditioning system converts direct-current power from the photovoltaic panel 21a into alternating-current power. The power conditioning system outputs the alternating-current power to the grid control unit 25.

The electric power consumer 22 is a set of facility groups that consume electric power. Examples of the electric power consumer 22 include servers and air conditioners constituting the energy management system (EMS) 3 that controls the microgrid 2. Further, an example of the electric power consumer 22 is an auxiliary machine of the hydrogen production system 23. The auxiliary machine of the hydrogen production system 23 is a hydrogen compressor, an air compressor, a cooling tower, or the like. The electric power consumer 22 may be a low-voltage consumer such as a general household. Meanwhile, the energy management system 3 of the present disclosure cannot control the power consumption of the electric power consumer 22.

The hydrogen production system 23 produces hydrogen by electrolyzing water. Generally, examples of water electrolysis methods include a solid polymer (PEM)-type water electrolysis method and an alkaline water electrolysis method. Any one may be used as the hydrogen production system 23. Hydrogen produced by the hydrogen production system 23 is stored in a hydrogen storage system. The stored hydrogen is carried outside from the microgrid 2 through transportation or the like. For example, the stored hydrogen may be filled into a hydrogen curdle or a hydrogen trailer by a hydrogen compressor and then transported to a place of demand for hydrogen. The stored hydrogen may be supplied to a fuel cell vehicle (FCV) through a dispenser (referred to as an "on-site hydrogen station"). The stored hydrogen may be supplied to another place of demand for hydrogen through a pipeline.

The power storage system 24 is a system capable of charging and discharging electric power. The power storage system 24 includes a power storage device (energy storage device) and a power conditioning system. The power storage device may be a secondary battery such as a lithium-ion battery, a lead storage battery, or a redox flow battery. The power storage device may be a flywheel power storage device. Generally, the response speed of the power storage device is faster than the response speed of the hydrogen production system 23 (water electrolyzer) and an electric boiler. For example, the response speed of the power storage device is equal to or less than 20 microseconds. The power conditioning system which is a power conversion device converts electric power between the power storage device and the grid control unit 25. The power conditioning system converts direct-current power from the power storage device into alternating-current power. The power conditioning system outputs the alternating-current power to the grid control unit 25. The power conditioning system converts the alternating-current power from the grid control unit 25 into direct-current power. The power conditioning system outputs the direct-current power to the power storage device. The power storage system 24 may further include a monitoring device that monitors the remaining amount v of the power storage device.

The grid control unit 25 distributes electric power to each unit including the electric power system 90. The grid control unit 25 is, for example, a power distribution panel.

The power measurement unit 26 measures electric power received from the electric power system 90. The power measurement unit 27 measures electric power transmitted to the electric power system 90. The power measurement units 26 and 27 are, for example, power meters.

The energy management system 3 has a function (power adjustment function) of controlling the power consumption of the hydrogen production system 23 included in the microgrid 2. Further, the energy management system 3 also has a function of controlling the charging/discharging power of the power storage system 24.

Figure 2:
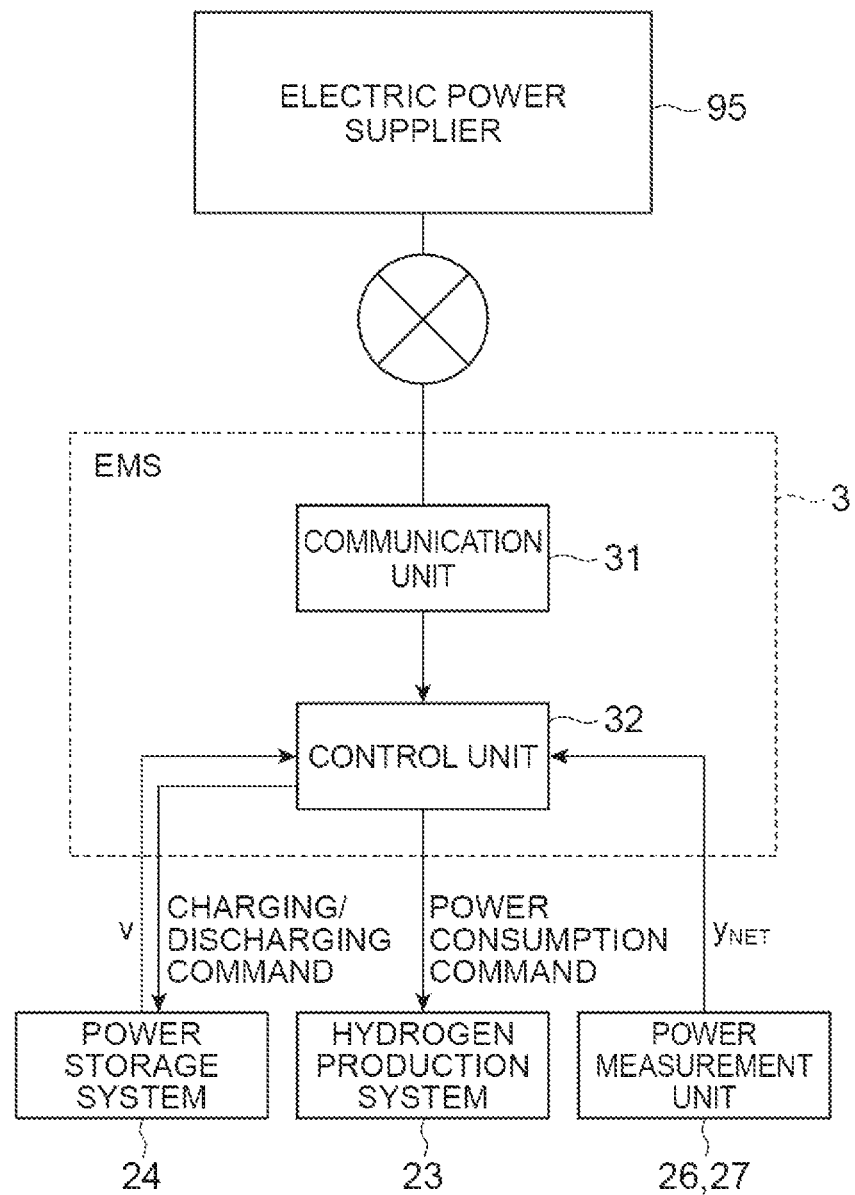
FIG. 2 is a diagram illustrating a functional configuration of the energy management system shown in FIG. 1.
Figure 3:
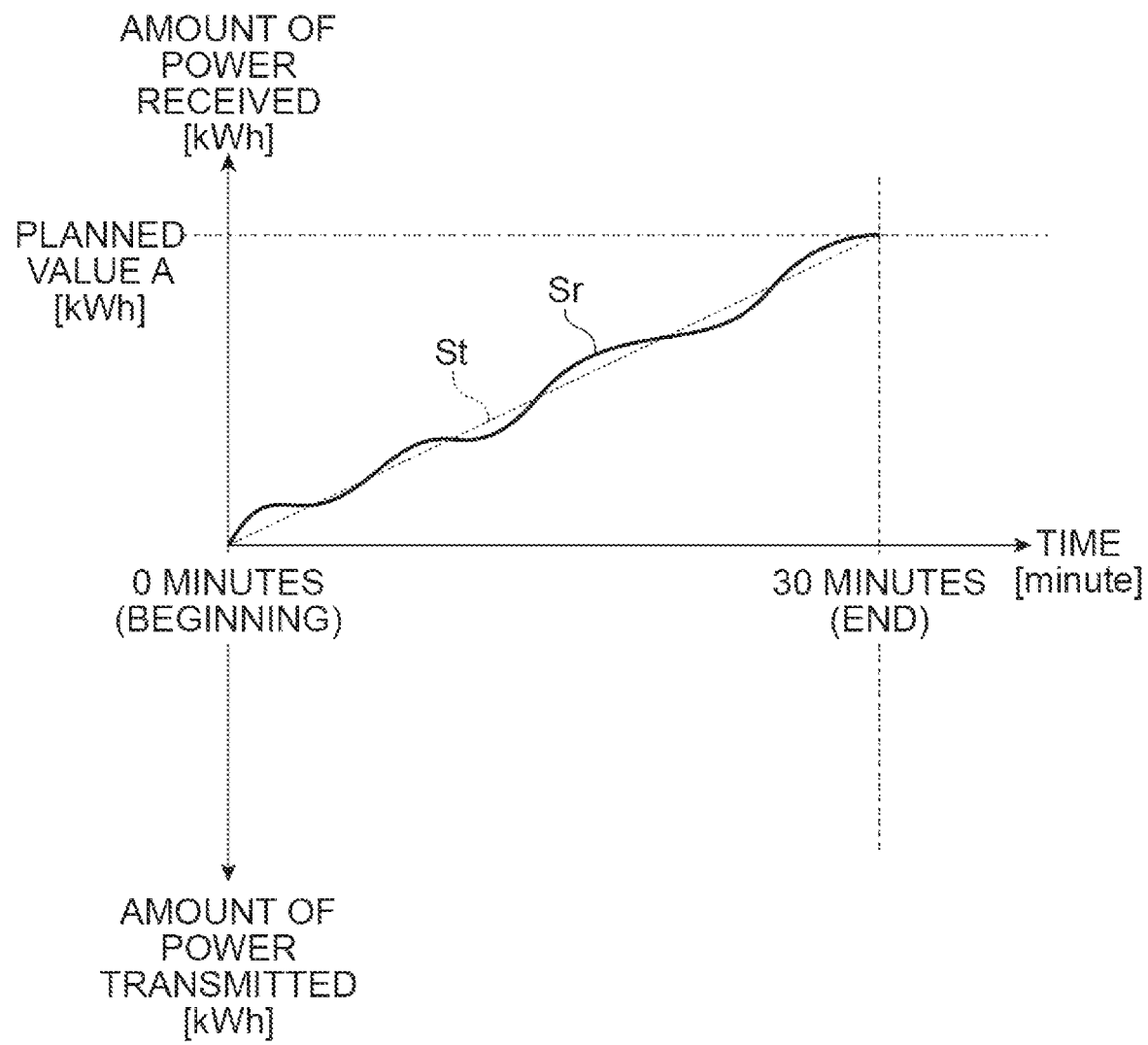
FIG. 3 is a conceptual diagram of planned value balancing control.

Next, the energy management system of the present disclosure will be described with reference to FIGS. 2 and 3. FIG. 2 is a diagram illustrating a functional configuration of the energy management system shown in FIG. 1. FIG. 3 is a conceptual diagram of planned value balancing control. The energy management system 3 functionally includes a communication unit 31 and a control unit 32.

The communication unit 31 is a functional unit that communicates with an external device. The communication unit 31 communicates with an electric power supplier 95 through, for example, a communication network. The communication network may be wired or wireless. Examples of the communication network include the Internet, a moving object communication network, and a wide area network (WAN). The communication unit 31 receives a planned value A from the electric power supplier 95. The planned value A is the integrated value of the grid power (the amount of the grid power) in a planned section. The planned value A is determined for each planned section. The planned section is, for example, a time interval of 30 minutes. The time length of the planned section depends on the form of contract with the electric power supplier 95 or the electric power market. The communication unit 31 outputs the planned value A to the control unit 32. Meanwhile, the planned value A may be determined inside the energy management system 3 and then the electric power supplier 95 may be notified of the planned value in advance.

The control unit 32 is a functional unit that performs planned value balancing control. The planned value balancing control will be described with reference to FIG. 3. The horizontal axis of FIG. 3 represents time (unit: minutes). The vertical axis of FIG. 3 represents the amount of the grid power (unit: kWh). In a case where the amount of the grid power is a positive value, the amount of the grid power indicates the amount of power received. In a case where the amount of the grid power is a negative value, the amount of the grid power indicates the amount of power transmitted. The control unit 32 generates a target trajectory St on the basis of the planned value A. The target trajectory St indicates a change over time in the control target value with respect to the integrated amount of the grid power (the amount of the grid power). The target trajectory St is generated for each planned section. The target trajectory St is 0 kWh at the beginning of the planned section (0 minutes). The target trajectory St reaches the planned value A at the end of the planned section (30 minutes). In the example shown in FIG. 3, the target trajectory St is represented by a straight line having a constant inclination. The inclination is obtained by dividing the planned value A by the time length T of the planned section.

The control unit 32 causes an integrated value (actual value) Sr of the grid power to asymptotically approach the planned value A at the end of the planned section using the adjustable power supply of the microgrid 2. The adjustable power supply of the microgrid 2 of the present disclosure is the hydrogen production system 23 and the power storage system 24. The integrated value Sr of the grid power is an integrated value of a measured value $y_{NET}$. The control unit 32 performs feedback control so that the integrated value Sr follows the target trajectory St. That is, the control unit 32 adjusts the power consumption of the hydrogen production system 23 through feedback control of the grid power. Further, the control unit 32 also adjusts the charging/discharging power of the power storage system 24 through feedback control of the grid power. The details of the planned value balancing control will be described later.

The control unit 32 acquires the planned value A from the communication unit 31 before a planned period. The control unit 32 acquires the measured value $y_{NET}$ from the power measurement units 26 and 27. In a case where the measured value $y_{NET}$ is a positive value, the measured value $y_{NET}$ is a measured value of electric power received from the electric power system 90. In a case where the measured value $y_{NET}$ is a negative value, the measured value $y_{NET}$ is a measured value of electric power transmitted from the electric power system 90. The control unit 32 acquires the remaining amount v of the power storage device from the power storage system 24. The remaining amount v is, for example, a state of charge (SOC) of the power storage device.

The control unit 32 transmits a power consumption command to the hydrogen production system 23. The power consumption command includes a command value $u_{EC}$ (first command value; see FIG. 4). The command value $u_{EC}$ indicates, for example, electric power to be consumed by the hydrogen production system 23. The command value $u_{EC}$ may be an amount of hydrogen to be produced by the hydrogen production system 23. The control unit 32 transmits a charging/discharging command to the power storage system 24. The charging/discharging command includes a command value $u_{BT}$ (second command value; see FIG. 4). The command value $u_{BT}$ indicates, for example, electric power to be charged and discharged by the power storage system 24.

Meanwhile, the energy management system 3 may further include functional units such as a user interface, a database, and a monitoring unit. However, FIG. 2 shows only functional units related to the planned value balancing control.

Figure 4:
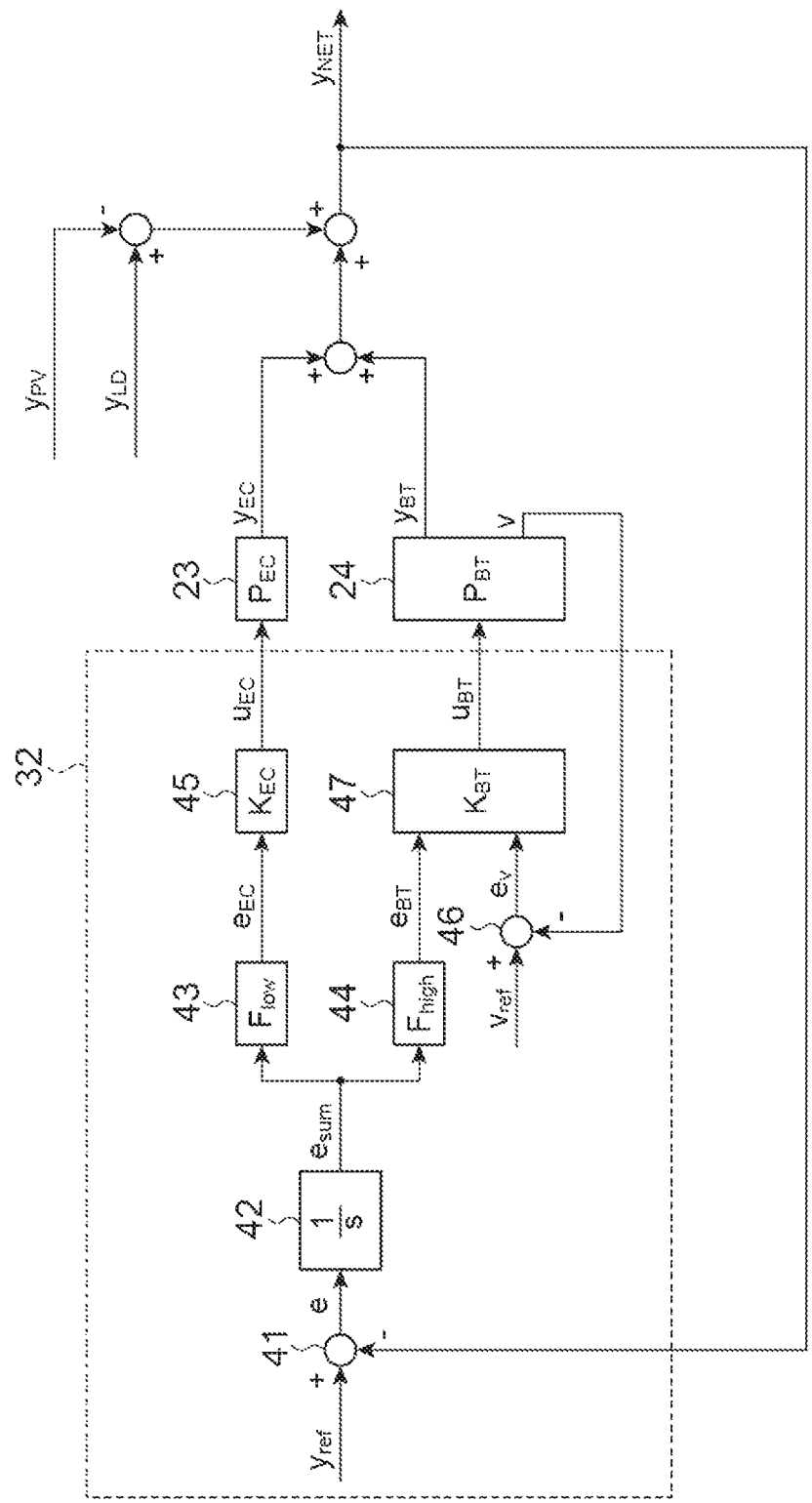
FIG. 4 is a block diagram illustrating planned value balancing control which is performed by a control unit shown in FIG. 2.
Figure 5:
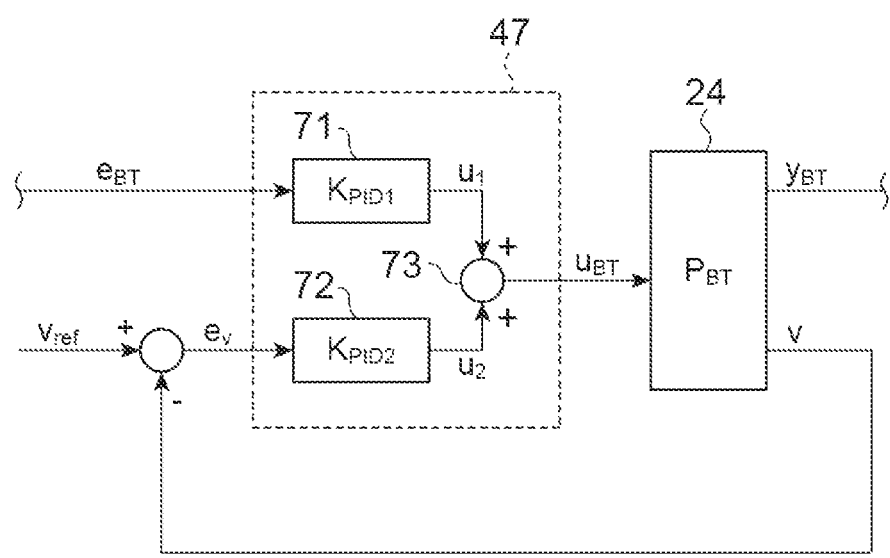
FIG. 5 is a detailed block diagram illustrating a controller for a power storage system shown in FIG. 4.

Next, the details of the planned value balancing control (power adjustment method) which is performed by the energy management system 3 will be described with reference to FIGS. 4 and 5. FIG. 4 is a block diagram illustrating planned value balancing control which is performed by the control unit shown in FIG. 2. FIG. 5 is a detailed block diagram illustrating a controller for the power storage system shown in FIG. 4. As shown in FIGS. 4 and 5, the control unit 32 includes a subtractor 41, an integrator 42, a low-pass filter 43, a high-pass filter 44, a controller 45, a subtractor 46, and a controller 47.

The control unit 32 calculates a target value $y_{ref}$ of the grid power (power target value) from the planned value A. Specifically, the control unit 32 calculates the target value $y_{ref}$ by differentiating the target trajectory St. The target trajectory St of the present disclosure is a straight line. Therefore, the control unit 32 divides the planned value A [kWh] by the time length T [h] of the planned section. As a result, the target value $y_{ref}$ [kW] is calculated. The subtractor 41 calculates an error e between the target value $y_{ref}$ and the measured value $y_{NET}$.

Specifically, the subtractor 41 calculates the error e by subtracting the measured value $y_{NET}$ from the target value $y_{ref}$.

The integrator 42 calculates an integration error $e_{sum}$ by integrating the error e with respect to time. The integrator 42 outputs the integration error $e_{sum}$ to the low-pass filter 43 and the high-pass filter 44. The integration error $e_{sum}$ is an integrated value of the error e. The integration error $e_{sum}$ is equivalent to a difference between the target trajectory St shown in FIG. 3 and the integrated value Sr of the grid power. Meanwhile, the integration error $e_{sum}$ is zero at a point in time of the beginning of the planned section.

Subsequently, the low-pass filter 43 extracts a low-frequency component $e_{EC}$ from the integration error $e_{sum}$. The low-pass filter 43 then outputs the low-frequency component $e_{EC}$ to the controller 45 for the hydrogen production system 23. The high-pass filter 44 extracts a high-frequency component $e_{BT}$ from the integration error $e_{sum}$. The high-pass filter 44 then outputs the high-frequency component $e_{BT}$ to the controller 47 for the power storage system 24. That is, the integration error $e_{sum}$ is separated into the low-frequency component $e_{EC}$ and the high-frequency component $e_{BT}$ by the low-pass filter 43 and the high-pass filter 44.

There is a degree of freedom in designing the low-pass filter 43 and the high-pass filter 44. The direct-current gain of the low-pass filter 43 is 1. The sum of the transfer function of the low-pass filter 43 and the transfer function of the high-pass filter 44 is 1. The transfer function of the low-pass filter 43 that satisfies such conditions is represented by, for example, Expression (1). The transfer function of the high-pass filter 44 is represented by, for example, Expression (2).

[Expression 1]

$$F_{low}(s) = \frac{1}{T_F s + 1} \quad (1)$$

[Expression 2]

$$F_{high}(s) = 1 - F_{low}(s) = \frac{T_F s}{T_F s + 1} \quad (2)$$

The time constant $T_F$ is a parameter defined by a designer. As shown in Expression (3), the time constant $T_F$ is, for example, an average value of the time constant $T_{EC}$ of the hydrogen production system 23 and the time constant $T_{BT}$ of the power storage system 24. The time constant $T_F$ is used, so that the integration error $e_{sum}$ is distributed to each system in consideration of a difference between the response speed of the hydrogen production system 23 and the response speed of the power storage system 24.

[Expression 3]

$$T_F = \frac{T_{EC} + T_{BT}}{2} \quad (3)$$

Subsequently, the controller 45 calculates the command value $u_{EC}$ on the basis of the low-frequency component $e_{EC}$ of the integration error $e_{sum}$. The controller 45 calculates the command value $u_{EC}$ for reducing the low-frequency component $e_{EC}$. The controller 45 calculates, for example, the command value $u_{EC}$ for making the low-frequency component $e_{EC}$ zero. Specifically, the controller 45 receives the low-frequency component $e_{EC}$ of the integration error $e_{sum}$. The controller 45 outputs the command value $u_{EC}$ corresponding to the low-frequency component $e_{EC}$ of the integration error $e_{sum}$ to the hydrogen production system 23. The controller 45 is, for example, a PID controller.

A target value $v_{ref}$ of the remaining amount is determined in advance in order to maintain the remaining amount of the power storage device included in the power storage system 24. The target value $v_{ref}$ may be set by a designer. The target value $v_{ref}$ may be set by an operator through a user interface. In the present disclosure, as shown in Expression (4), the target value $v_{ref}$ is an average value of the operational upper limit $v_{max}$ and the operational lower limit $v_{min}$ of the remaining amount of the power storage device.

[Expression 4]

$$v_{ref} = \frac{v_{max} + v_{min}}{2} \quad (4)$$

The subtractor 46 calculates an error $e_v$ between the target value $v_{ref}$ and the remaining amount v. The subtractor 46 then outputs the error $e_v$ to the controller 47. Specifically, the subtractor 46 calculates the error $e_v$ by subtracting the remaining amount v from the target value $v_{ref}$. The controller 47 then calculates the command value $u_{BT}$ on the basis of the high-frequency component $e_{BT}$ of the integration error $e_{sum}$ and the error $e_v$. The controller 47 calculates the command value $u_{BT}$ for reducing the high-frequency component $e_{BT}$ and the error $e_v$. The controller 47 calculates, for example, the command value $U_{BT}$ for making the high-frequency component $e_{BT}$ and the error $e_v$ zero. Specifically, the controller 47 receives the high-frequency component $e_{BT}$ of the integration error $e_{sum}$ and the error $e_v$. The controller 47 then outputs the command value $u_{BT}$ corresponding to the high-frequency component $e_{BT}$ of the integration error $e_{sum}$ and the error $e_v$ to the power storage system 24. As shown in FIG. 5, the controller 47 includes, for example, a controller 71, a controller 72, and an adder 73.

The controller 71 calculates a command value $u_1$ on the basis of the high-frequency component $e_{BT}$ of the integration error $e_{sum}$. The controller 71 calculates the command value $u_1$ for reducing the high-frequency component $e_{BT}$. The controller 71 calculates, for example, the command value $u_1$ for making the high-frequency component $e_{BT}$ zero. Specifically, the controller 71 receives the high-frequency component $e_{BT}$ of the integration error $e_{sum}$. The controller 71 then outputs the command value $u_1$ corresponding to the high-frequency component $e_{BT}$ of the integration error $e_{sum}$ to the adder 73. The controller 71 is, for example, a PID controller. The controller 72 calculates a command value $u_2$ on the basis of the error $e_v$. The controller 72 calculates the command value $u_2$ for reducing the error $e_v$. The controller 72 calculates, for example, the command value $u_2$ for making the error $e_v$ zero. Specifically, the controller 72 receives the error $e_v$. The controller 72 then outputs the command value corresponding to the error $e_v$ to the adder 73. The controller 72 is, for example, a PID controller. The adder 73 receives the command value $u_1$ and the command value $u_2$. The adder 73 calculates the command value $u_{BT}$ by adding the command value $u_1$ and the command value $u_2$. The adder 73 outputs the command value $u_{BT}$ to the power storage system 24.

Subsequently, the hydrogen production system 23 receives the command value $u_{EC}$ from the energy management system 3 (the control unit 32). The hydrogen production system 23 that has received the command value $u_{EC}$ produces an amount of hydrogen corresponding to the command value $u_{EC}$. Further, the hydrogen production system 23 that has received the command value $u_{EC}$ consumes power consumption $y_{EC}$ corresponding to the command value $u_{EC}$. Similarly, the power storage system 24 receives the command value $u_{BT}$ from the energy management system 3 (the control unit 32). The power storage system 24 that has received the command value $u_{BT}$ charges and discharges charging/discharging power $y_{BT}$ corresponding to the command value $u_{BT}$. In a case where the charging/discharging power $y_{BT}$ is a positive value, the charging/discharging power $y_{BT}$ is electric power which is charged to the power storage device of the power storage system 24. In a case where the charging/discharging power $y_{BT}$ is a negative value, the charging/discharging power $y_{BT}$ is electric power which is discharged from the power storage device of the power storage system 24.

The power consumption $y_{EC}$ and the charging/discharging power yin are the sum of generated power $y_{PV}$ of the power generation system 21 and power consumption $y_{LD}$ of the electric power consumer 22. As a result, the measured value $y_{NET}$ of the microgrid 2 is determined. Specifically, as shown in FIG. 4, the measured value $y_{NET}$ is determined by Expression (5).

[Expression 5]

$$y_{NET} = y_{EC} + y_{BT} + y_{LD} - y_{PV} \quad (5)$$

The above processing is repeated at predetermined time intervals during the planned section. The control unit 32 resets the integrator 42 at the end of the planned section. That is, the integration error $e_{sum}$ is set to zero at the beginning of the next planned section. Meanwhile, the integration error $e_{sum}$ at the end is equivalent to the amount of imbalance [kWs] of the planned section. The control unit 32 may store the integration error $e_{sum}$ at the end in a memory. The control unit 32 may transmit the integration error $e_{sum}$ at the end to an external device of the energy management system 3 through the communication unit 31. In this case, the control unit 32 may convert the unit of the integration error $e_{sum}$. For example, the control unit 32 may set the unit of the integration error $e_{sum}$ from kilowatt seconds (kWs) to kilowatt hours (kWh).

Figure 6:
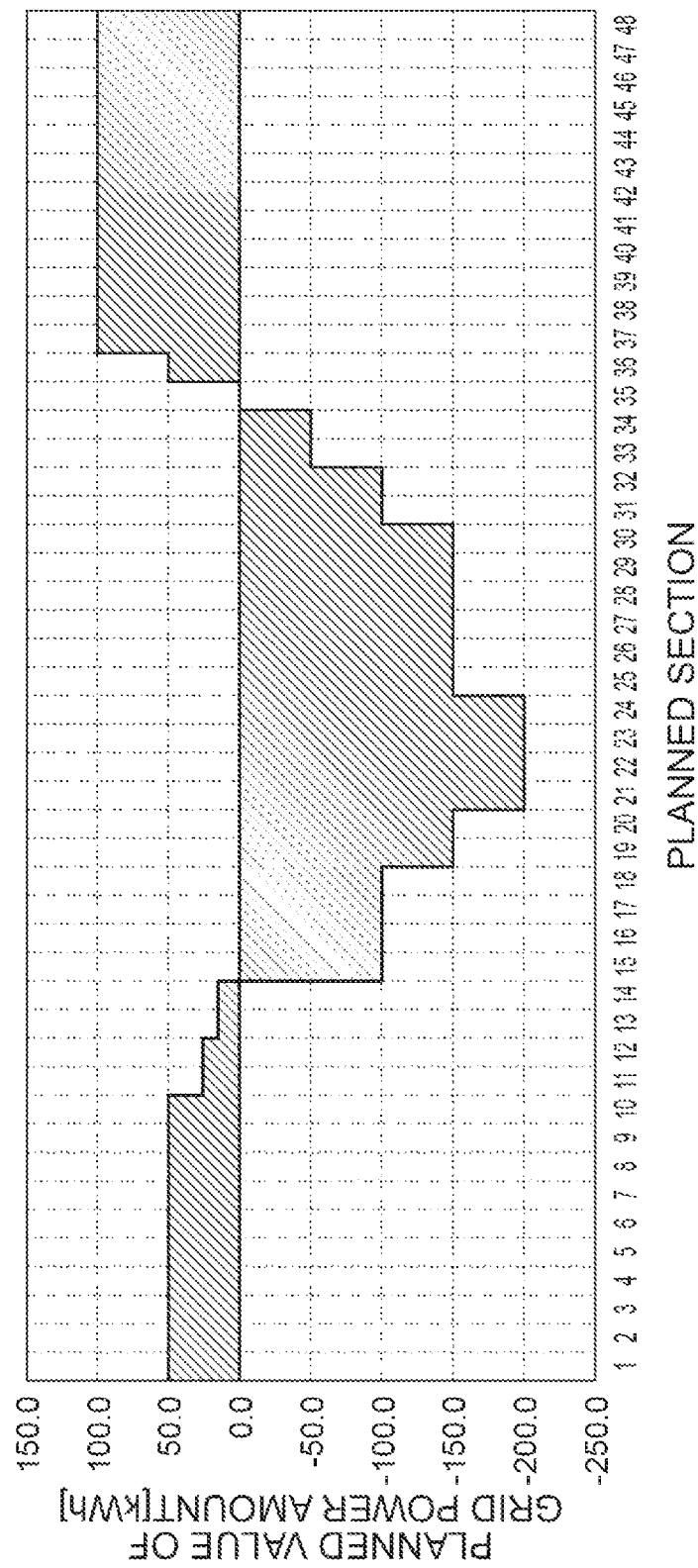
FIG. 6 is a diagram illustrating planned values of grid power used for simulation over 24 hours.
Figure 7:
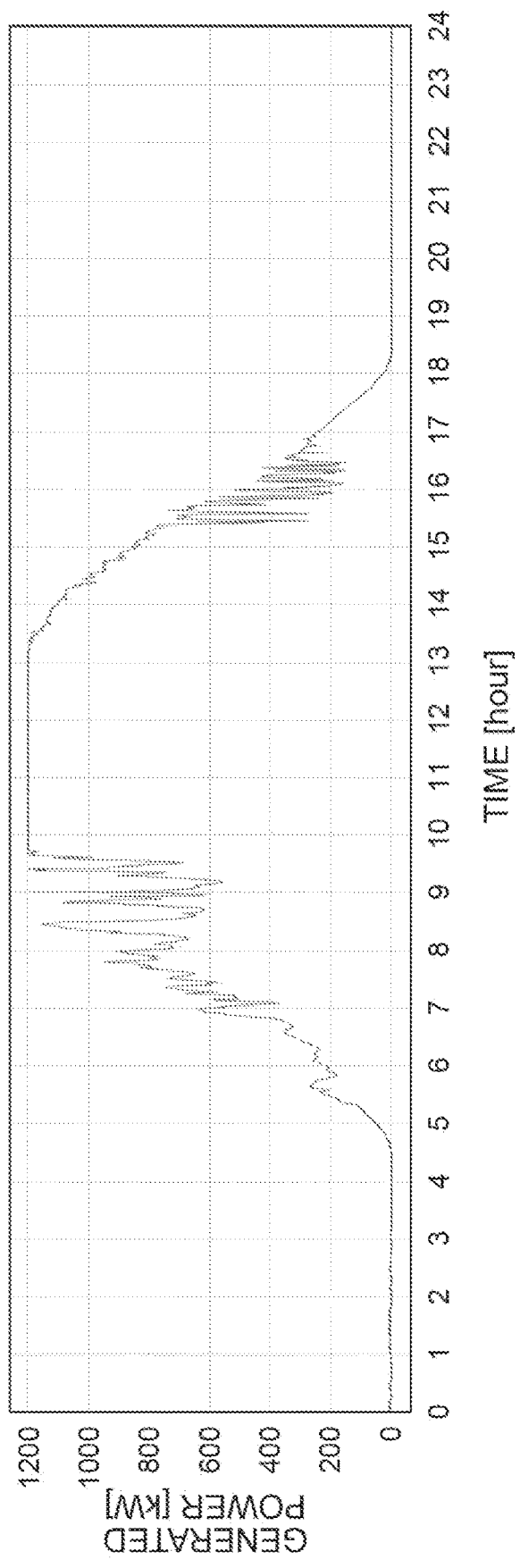
FIG. 7 is a diagram illustrating a change over time in power generated by photovoltaic power generation used for simulation.
Figure 8:
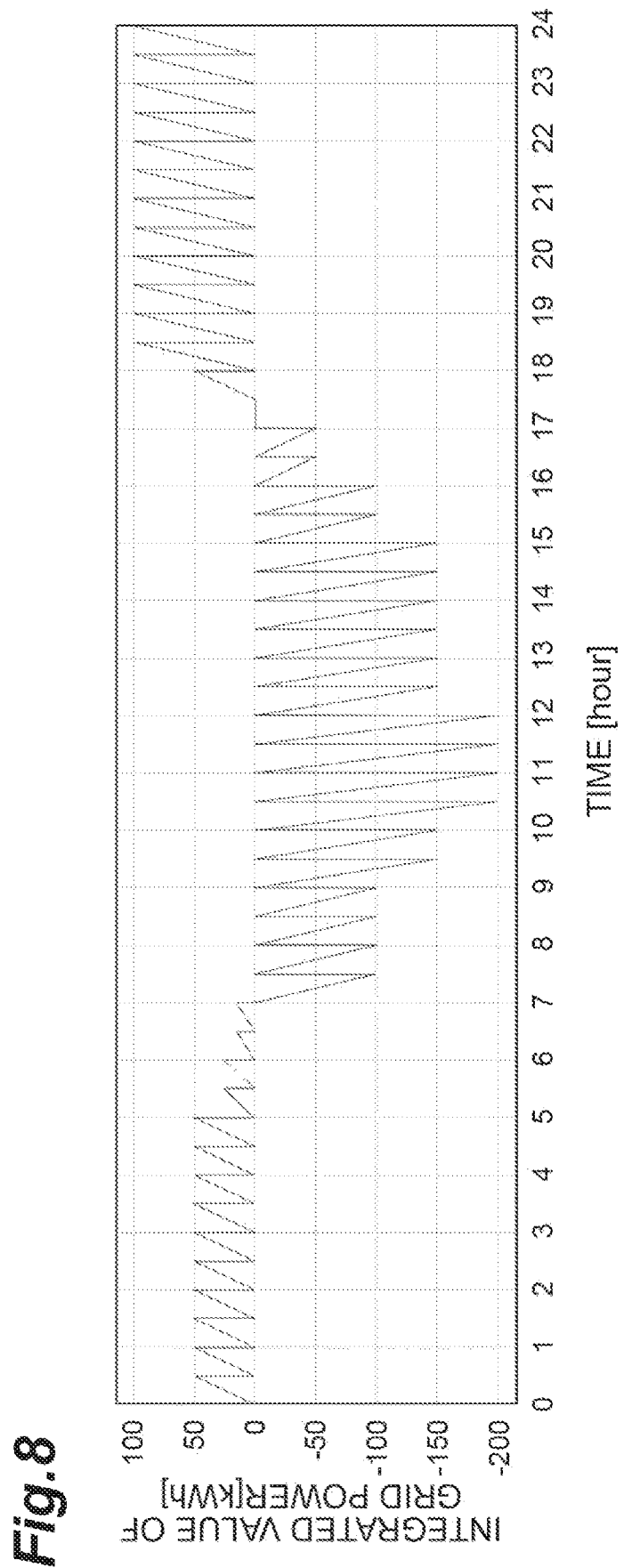
FIG. 8 is a diagram illustrating simulation results of integrated values of the grid power.
Figure 9:
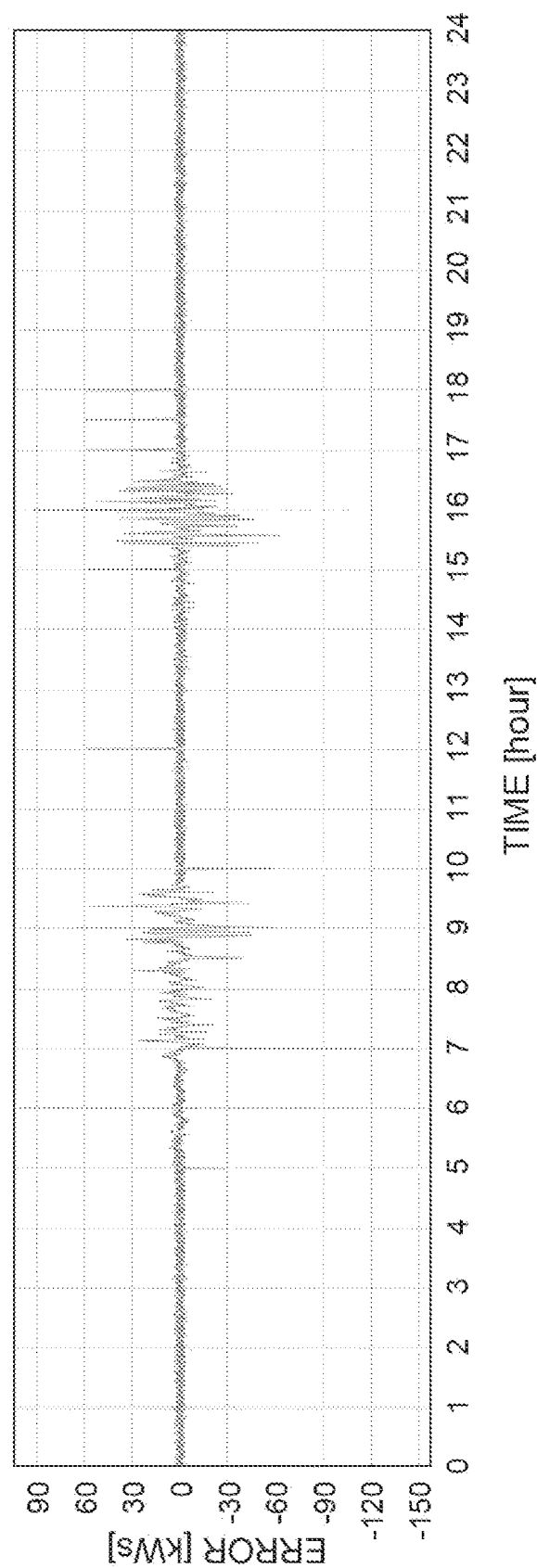
FIG. 9 is a diagram illustrating simulation results of integration errors.
Figure 10:
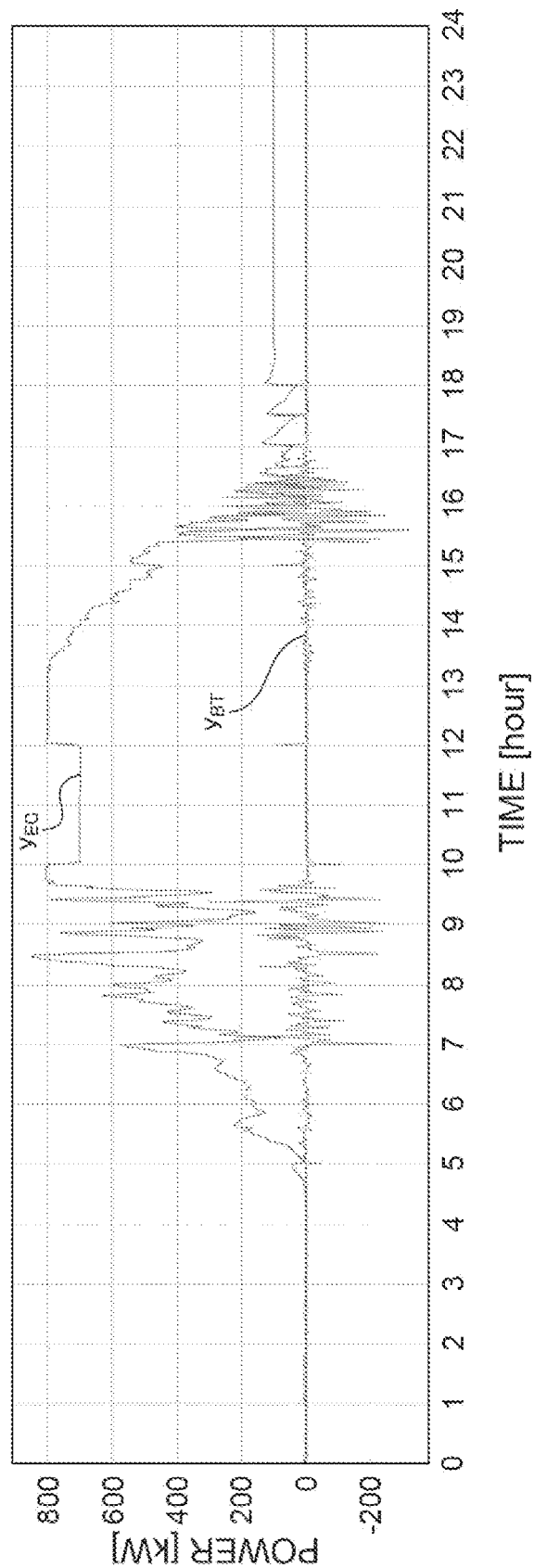
FIG. 10 is a diagram illustrating simulation results of power consumption of a hydrogen production system and charging/discharging power of the power storage system.
Figure 11:
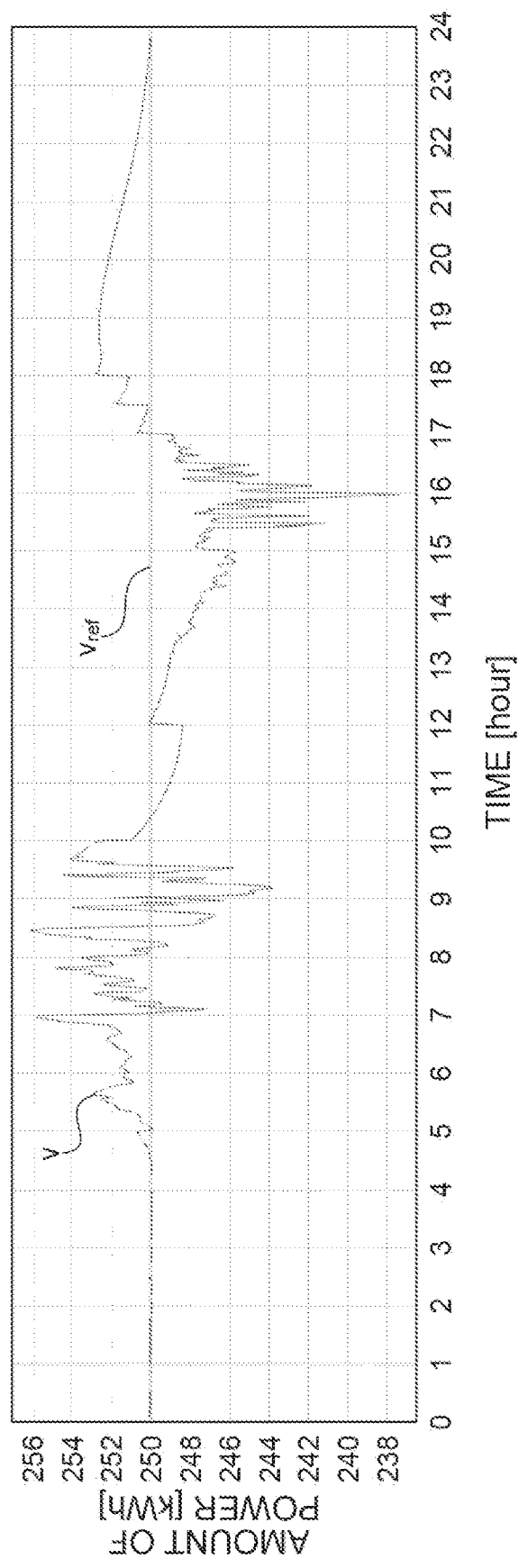
FIG. 11 is a diagram illustrating simulation results of the remaining amount of a power storage device.

Next, the operational effects of the power adjustment method which is performed by the energy management system 3 will be described with reference to FIGS. 6 to 11. FIG. 6 is a diagram illustrating planned values of the grid power for 24 hours used for simulation. FIG. 7 is a diagram illustrating a change over time in power generated by photovoltaic power generation used for simulation. FIG. 8 is a diagram illustrating simulation results of integrated values of the grid power. FIG. 9 is a diagram illustrating simulation results of integration errors. FIG. 10 is a diagram illustrating simulation results of power consumption of the hydrogen production system and charging/discharging power of the power storage system. FIG. 11 is a diagram illustrating simulation results of the remaining amount of the power storage device.

The horizontal axis of FIG. 6 is the number of the planned section. A larger number of the planned section indicates that time has elapsed. The horizontal axes of FIGS. 7 to 11 represent time from 0 o'clock to 24 o'clock. The vertical axis of FIG. 6 represents the planned value (unit: kWh) of the grid power. The vertical axis of FIG. 7 represents the generated power $y_{PV}$ (unit: kW) of the power generation system 21. The vertical axis of FIG. 8 represents the integrated value (unit: kWh) of the grid power. The vertical axis of FIG. 9 represents the integration error $e_{sum}$ (unit: kWs). The vertical axis of FIG. 10 represents the power consumption $y_{EC}$ of the hydrogen production system 23 and the charging/discharging power $y_{BT}$ (unit: kW) of the power storage system 24. The vertical axis of FIG. 11 represents the remaining amount v of the power storage device and the target value $v_{ref}$ (unit: kWh).

The following numerical values were set as conditions for the simulation of the present disclosure.

The generated power $y_{PV}$ of the power generation system 21: maximum 1,200 kW The power consumption $y_{EC}$ of the hydrogen production system 23: rated 1,000 kW The capacity of the power storage device of the power storage system 24: 500 kWh The maximum value of the charging/discharging power $y_{BT}$: +400 kW The minimum value of the charging/discharging power $y_{BT}$: −400 kW The power consumption $y_{LD}$ of the electric power consumer 22: 100 kW The target value $v_{ref}$ of the remaining amount of the power storage device: 250 kWh As shown in FIG. 6, planned values for 24 hours (48 planned sections) were used as the planned values of the grid power. The time length of each planned section is 30 minutes. The first planned section is a section from 00:00 to 00:30. After that, every time the number of the planned section increases, the planned section shifts by 30 minutes. Meanwhile, the planned value of a corresponding planned section is only required to be determined before the current time. Therefore, all the planned values of the 48 planned sections are not necessarily determined at 00:00. The change over time in the generated power $y_{PV}$ shown in FIG. 7 is a typical example of power generated by photovoltaic power generation. The generated power $y_{PV}$ shown in FIG. 7 fluctuates sharply between 7:00 and 10:00 and between 15:00 and 17:00. This fluctuation is due to the influence of clouds.

As shown in FIG. 8, it can be understood that at the end of each planned section, the integrated value of the grid power (equivalent to the actual value in FIG. 3) coincides with the planned value with a high degree of accuracy. That is, the planned value balancing is achieved. Specifically, as shown in FIG. 9, the integration error $e_{sum}$ is about 150 kWs (=0.04 kWh) at maximum. That is, although the generated power $y_{PV}$ fluctuates, it can be understood that the integrated value of the grid power follows the target trajectory with a high degree of accuracy.

As shown in FIG. 10, charging and discharging of the power storage system 24 are performed between 7:00 and 10:00 and 15:00 and 17:00 when the generated power $y_{PV}$ fluctuates sharply. Therefore, it can be understood that a low-period fluctuation among the fluctuations in the generated power $y_{PV}$ is compensated for by the hydrogen production system 23. Further, it can be understood that a high-period fluctuation among the fluctuations in the generated power $y_{PV}$ is compensated for by the power storage system 24.

As shown in FIG. 11, the error $e_v$ between the target value $v_{ref}$ and the remaining amount v is about 10 kWh at maximum. Since the capacity of the power storage device is 500 kWh, it can be understood that the remaining amount v does not deviate greatly from the target value $v_{ref}$. That is, it can be understood that the power storage device is in operation. That is, a situation in which the power storage device is fully charged or over-discharged and loses its adjustability is avoided.

The energy management system 3 described above and a power amount adjustment method performed by the energy management system 3 generate the command value $u_{EC}$ on the basis of the low-frequency component $e_{EC}$ of the integration error $e_{sum}$. Next, the energy management system 3 and the power amount adjustment method generate the command value $u_{BT}$ on the basis of the high-frequency component $e_{BT}$ of the integration error $e_{sum}$. The energy management system 3 and the power amount adjustment method output the command value $u_{EC}$ to the hydrogen production system 23, and output the command value $u_{BT}$ to the power storage system 24. Thereby, both the power consumption $y_{EC}$ of the hydrogen production system 23 and the charging/discharging power $y_{BT}$ of the power storage system 24 in the microgrid 2 are simultaneously controlled in order to comply with the planned value balancing constraint of the electric power system 90.

Generally, a response time (response speed) after the hydrogen production system 23 receives the command value $u_{EC}$ and before it consumes the power consumption $y_{EC}$ is longer than a response time (response speed) after the power storage system 24 receives the command value $u_{BT}$ and before it charges and discharges the charging/discharging power $y_{BT}$. The low-frequency component $e_{EC}$ is a component that fluctuates in the long term. That is, a high-speed response is not required. On the other hand, the high-frequency component $e_{BT}$ is a component that fluctuates in the short term. That is, a high-speed response is required. The response speed of the hydrogen production system 23 is slow. Therefore, the standalone hydrogen production system 23 cannot follow a fluctuation in the integration error $e_{sum}$ caused by a sudden fluctuation in the generated power $y_{PV}$ or the like. Therefore, there is concern of imbalance not being able to be avoided. In contrast, the hydrogen production system 23 copes with a long-term fluctuation by the command value $u_{EC}$ being generated on the basis of the low-frequency component $e_{EC}$. On the other hand, the power storage system 24 copes with a short-term fluctuation by the command value $u_{BT}$ being generated on the basis of the high-frequency component $e_{BT}$. With such a configuration, the slow response speed of the hydrogen production system 23 can be compensated for by the power storage system 24. Therefore, it is possible to follow a fluctuation in the integration error $e_{sum}$. As a result, it is possible to improve the performance of the planned value balancing control.

For example, in a case where the microgrid 2 includes only the power storage system 24 as an adjustable power supply, a high-capacity power storage device is required to avoid imbalance. On the other hand, the hydrogen production system 23 and the power storage system 24 are used in combination as an adjustable power supply, and thus it is possible to reduce the capacity of the power storage device. As the capacity of the power storage device becomes larger, the price tends to increase. A reduction in the capacity of the power storage device makes it possible for the cost to be reduced.

For example, in a case where the error e between the target value $y_{ref}$ of the grid power and the measured value $y_{NET}$ of the grid power is used for feedback control instead of the integration error $e_{sum}$, the measured value $y_{NET}$ follows the target value $y_{ref}$. However, since the integrated value of the measured value $y_{NET}$ (the integrated value of the grid power) deviates from the target trajectory St, there is concern of the amount of imbalance increasing. On the other hand, the error e between the target value $y_{ref}$ of the grid power and the measured value $y_{NET}$ of the grid power is calculated. The integration error $e_{sum}$ is calculated by integrating the error e. The integration error $e_{sum}$ is used for feedback control, and thus even when the integrated value of the measured value $y_{NET}$ deviates from the target trajectory St, it can be restored by feedback control. As a result, it is possible to improve the performance of the planned value balancing control. A simple calculation of integrating the error e between the target value $y_{ref}$ and the measured value $y_{NET}$ allows the integration error $e_{sum}$ to be calculated.

When the power storage device is a fully charged state or an over-discharged state, the power storage device loses its adjustability. As a result, a reduction or loss of ability to avoid imbalance occurs. When the power storage device such as a lithium-ion battery continues to be in a fully charged state or an over-discharged state, the deterioration of the power storage device is accelerated. On the other hand, the command value $u_{BT}$ is generated on the basis of the error $e_v$ between the remaining amount v and the target value $y_{ref}$ of the remaining amount of the power storage device included in the power storage system 24, and the high-frequency component $e_{BT}$. According to such a configuration, it is possible to control the charging/discharging power $y_{BT}$ of the power storage system 24 (power storage device) so that the remaining amount v does not deviate considerably from the target value $y_{ref}$. Therefore, it is possible to reduce a possibility of the power storage device being in a fully charged state or an over-discharged state. Thereby, it is possible to suppress the deterioration of the power storage device. Therefore, it is possible to maintain the adjustability of the power storage device. As a result, it is possible to further improve the performance of the planned value balancing control.

The target trajectory St is a straight line having a constant inclination. The control target value for the integrated amount of the grid power increases at a constant rate as time passes in the planned section. In this case, it is possible to easily set the target trajectory St and control target value. Therefore, it is possible to reduce a calculation load.

The power adjustment method and the power adjustment device of the present disclosure are not limited to the above-described content.

The power generation system 21 is not limited to a photovoltaic power generation system. The power generation system 21 may be a wind power generation system, a geothermal power generation system, a biomass power generation system, a refuse power generation system, or a combination thereof. Power generated by a photovoltaic power generation device is influenced by weather conditions such as solar radiation, temperature, and snowfall. Power generated by a wind power generation device is influenced by the speed of wind. Therefore, the power generated by these power generation devices may fluctuate sharply. The properties of biomass and refuse such as waste or sludge which are raw materials for biomass power generation and refuse power generation are generally unstable. In the biomass power generation and the refuse power generation, generated power is not stable due to the contamination of materials which are not suitable for temporary incineration, or the like. In this way, the power generation system 21 may be a power generation system with a large fluctuation in output. In this case, it is difficult to obtain generated power according to the planned value. Consequently, it is necessary to eliminate the imbalance using the hydrogen production system 23 and the power storage system 24. According to the energy management system 3, it is possible to suppress disturbance factors with respect to received power. In other words, according to the energy management system 3, it is possible to suppress fluctuation factors of renewable energy with respect to transmitted power.

The power generation system 21 may include a generator capable of controlling power generated by a gas turbine, a gas engine, and the like. The microgrid 2 may not include the power generation system 21.

The microgrid 2 may include another power consuming device (facility) instead of the hydrogen production system 23. Further, the microgrid 2 may include another power consuming device (facility) in addition to the hydrogen production system 23. Examples of another power consuming device include an electric boiler and a steam accumulator.

The controller 45, the controller 71, and the controller 72 of the present disclosure are PID controllers. The controller 45, the controller 71, and the controller 72 of the present disclosure may other controllers such as a P controller, a PI controller, a PD controller, an I-PD controller, and a two-degree-of-freedom PID controller. The controller 45, the controller 71, and the controller 72 may be designed using theories of H2 control theory and H∞ control theory.

In the present disclosure, description in a continuous time has been given, but it may be in a discrete time. The hydrogen production system 23 and the power storage system 24 may include a control system designed in a discrete time system (multi-rate system) with different control and measurement periods. The low-pass filter 43 and the high-pass filter 44 may be designed using a well-known discrete time filter design method such as, for example, a Butterworth filter. As the controller 45, the controller 71, and the controller 72, a speed-type PID controller which is also referred to as a velocity form may be used. The speed-type PID controller is often used as a technique to prevent integrator windup in a discrete-time PID design.

In the present disclosure, the target value $v_{ref}$ is a fixed value. The target value $v_{ref}$ may be a variable value to which change is applied. The target value $v_{ref}$ may be manually set by an operator. The target value $v_{ref}$ may be created inside the energy management system 3 (the control unit 32). The target value $v_{ref}$ may be distributed from outside the energy management system 3 at regular time intervals. For example, in a case where the weather forecast predicts fine weather, the target value $v_{ref}$ may be set to draw a trajectory of rising (charging) during the daytime and decreasing (discharging) after sunset. In a case where the weather forecast predicts rain, the target value $v_{ref}$ may always set to the average value of the operational upper limit $v_{max}$ and the operational lower limit $v_{min}$ of the remaining amount of the power storage device. According to such a configuration, it is possible to use, at night, the generated power $y_{PV}$ generated by the power generation system 21 during the daytime when the weather is fine (power shift).

Figure 12:
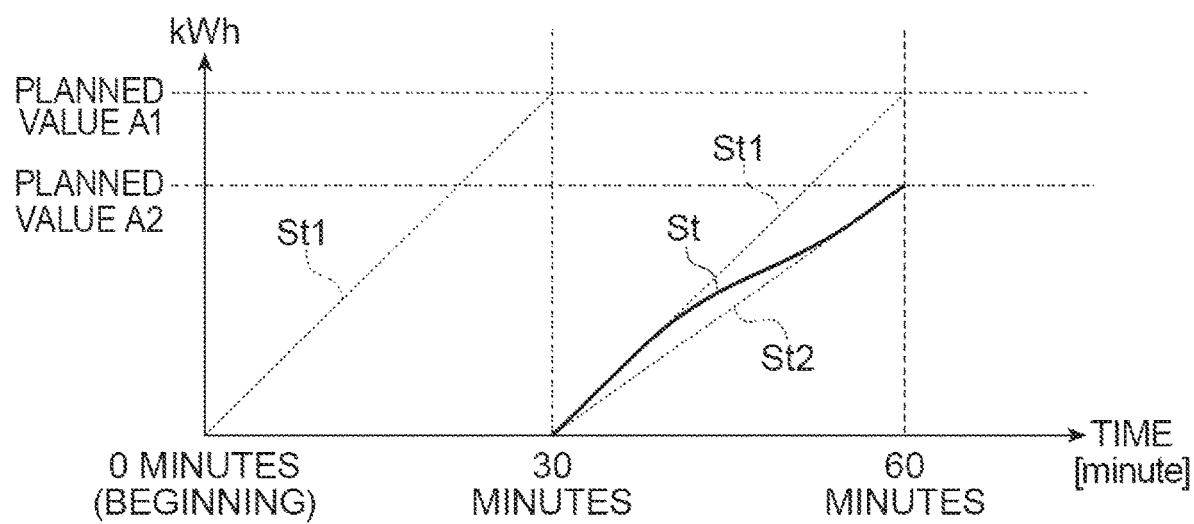
FIG. 12 is a diagram illustrating another example of a target trajectory.

In the present disclosure, the target trajectory St was 0 kWh at the beginning of the planned section, and was a straight line reaching the planned value A at the end of the planned section. The target value $y_{ref}$ was an average value obtained by dividing the planned value A by the time length T. However, the target trajectory St and the target value $y_{ref}$ obtained by differentiating the target trajectory St are not limited thereto. For example, the target trajectory St shown in FIG. 12 may be used. In the target trajectory St shown in FIG. 12, the inclination at the beginning of a planned section (30 minutes to 60 minutes) is equal to the inclination of an average target trajectory St1 in the previous planned section (0 minutes to 30 minutes), and the inclination at the end is equal to the inclination of an average target trajectory St2 in the planned section (30 minutes to 60 minutes). In this case, the target value $y_{ref}$ is continuous at a change point between two planned sections. In other words, the rate of increase in the control target value (inclination of the target trajectory St) changes continuously from the previous time interval. According to such a configuration, the continuity of control is maintained. Therefore, it is possible to improve the stability of feedback control. As a result, it is possible to improve the performance of the planned value balancing control.

Figure 13:
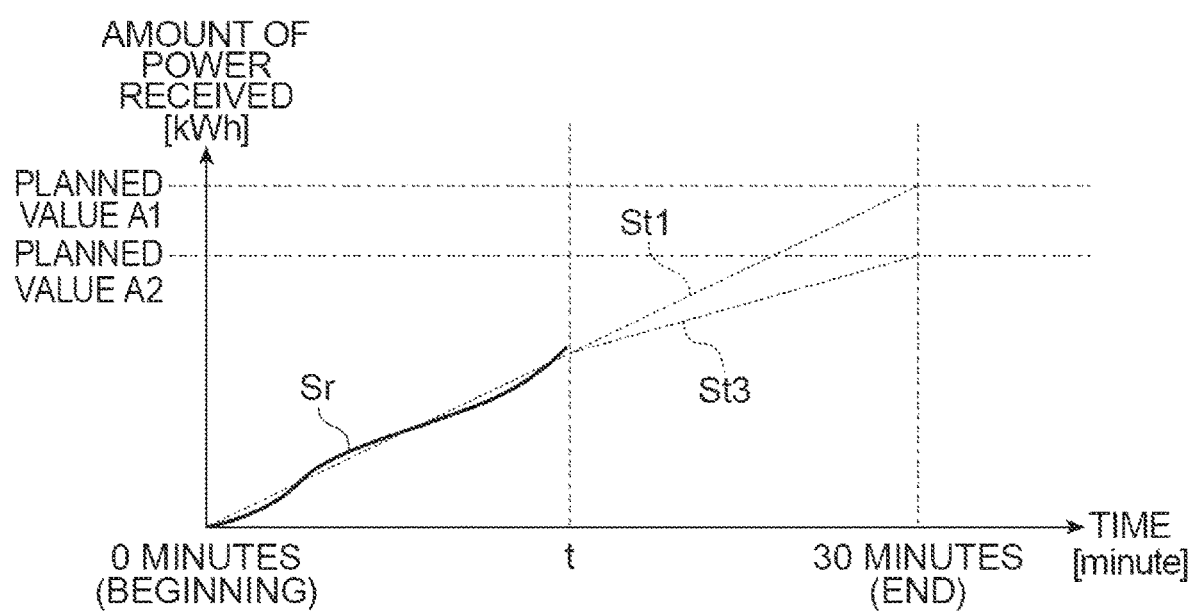
FIG. 13 is a diagram illustrating still another example of the target trajectory.

In the present disclosure, the planned value was given in advance for each planned section. As shown in FIG. 13, the planned value may change during the planned section. In the example of FIG. 13, the target trajectory St1 is determined on the basis of the planned value A1. The integrated value Sr of the grid power is controlled so as to be along the target trajectory St1. At time t, when the planned value A1 is changed to a planned value A2, a new target trajectory St3 is used. The new target trajectory St3 is a straight line reaching the planned value A2 at the end of the planned section from the control target value of the target trajectory St1 at time t. In a demand response mechanism, the planned value may be changed within the planned section. It is also possible to easily cope with such a change in the planned value.

A nonlinear gain may be used as a gain of the controller 72. For example, in a case where the absolute value of the error $e_v$ is small, the gain of the controller 72 may be set to a small gain. The gain of the controller 72 may be set to 0. In a case where the absolute value of the error $e_v$ is large, the gain of the controller 72 may be set to a large gain. In other words, in a case where the remaining amount v approaches the operational upper limit $v_{max}$ or the operational lower limit $v_{min}$, the gain of the controller 72 may be set to a large gain. Strict control is not required for the remaining amount v. Therefore, by using the nonlinear gain as described above, it is possible to give priority to the planned value balancing control in a range in which there is no problem with the remaining amount v. Especially in a case where the absolute value of the error is small, setting the gain of the controller 72 to 0 means providing a dead zone in control of the remaining amount v. That is, the remaining amount v is maintained within a predetermined range with the target value $v_{ref}$ as a center.

The calculation performed by the control unit 32 is not limited to the calculation shown in the block diagram of FIG. 4. A modification example of the control unit 32 will be described with reference to FIGS. 14 to 18. FIGS. 14 to 18 are block diagrams illustrating the planned value balancing control which is performed by a control unit of the modification example.

Figure 14:
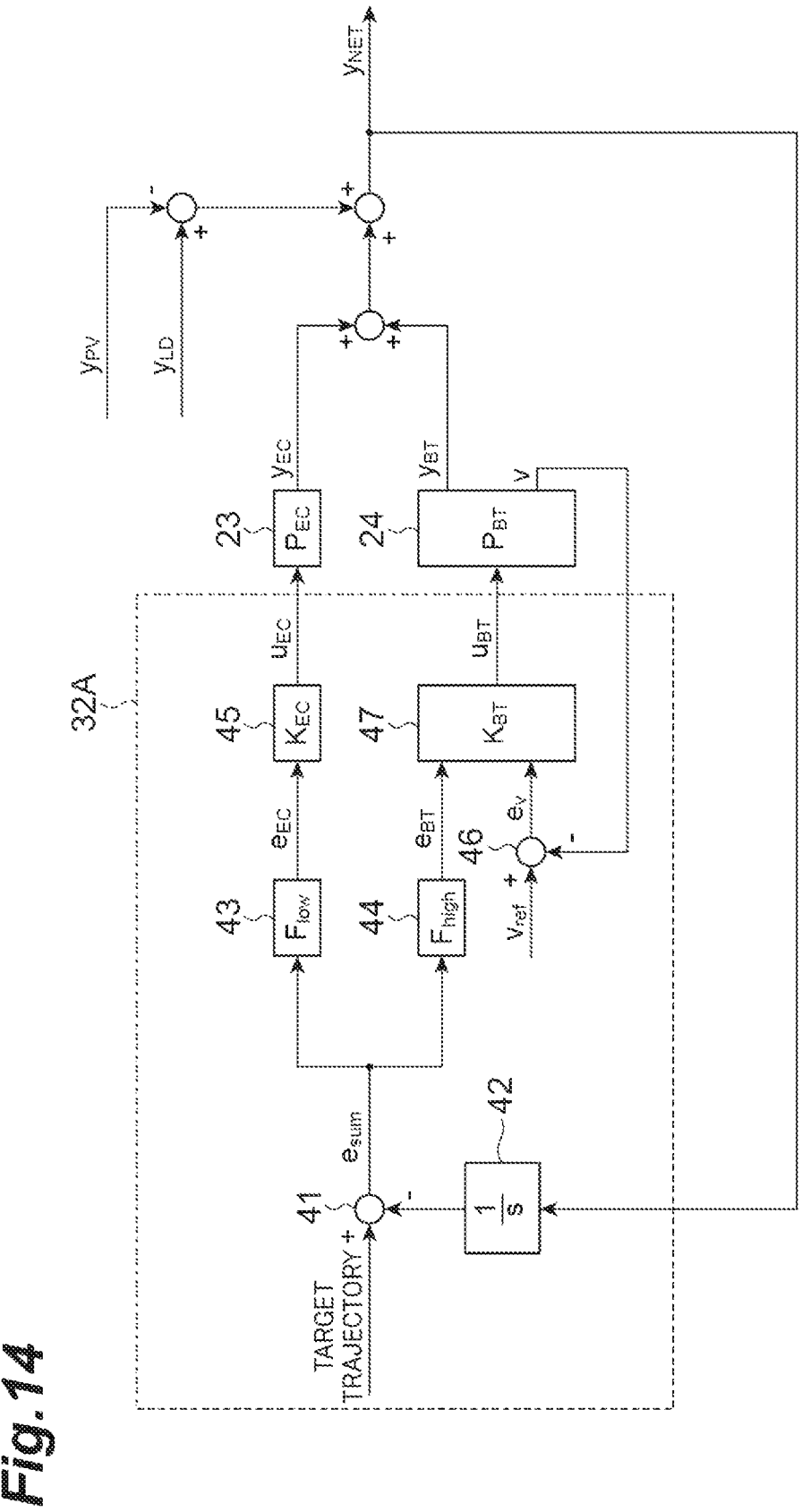
FIG. 14 is a block diagram illustrating planned value balancing control which is performed by a control unit of a modification example.

A control unit 32A shown in FIG. 14 differs mainly from the control unit 32 in the disposition of the integrator 42. The integrator 42 of the control unit 32A calculates the integrated value Sr (actual value) by time-integrating the measured value $y_{NET}$. The integrator 42 then outputs the integrated value Sr to the subtractor 41. The subtractor 41 calculates an error (difference) between the target trajectory St and the integrated value Sr as the integration error $e_{sum}$. Specifically, the subtractor 41 calculates the integration error $e_{sum}$ by subtracting the integrated value Sr from the current control target value in the target trajectory St. The subtractor 41 then outputs the integration error $e_{sum}$ to the low-pass filter 43 and the high-pass filter 44. Other calculations are the same as those of the control unit 32, and thus description thereof will be omitted. According to such a configuration, the target trajectory St can be used for direct feedback control. Further, the integration error $e_{sum}$ can be calculated simply by calculating the difference between the control target value and the integrated value (the integrated value Sr) of the measured value $y_{NET}$.

Figure 15:
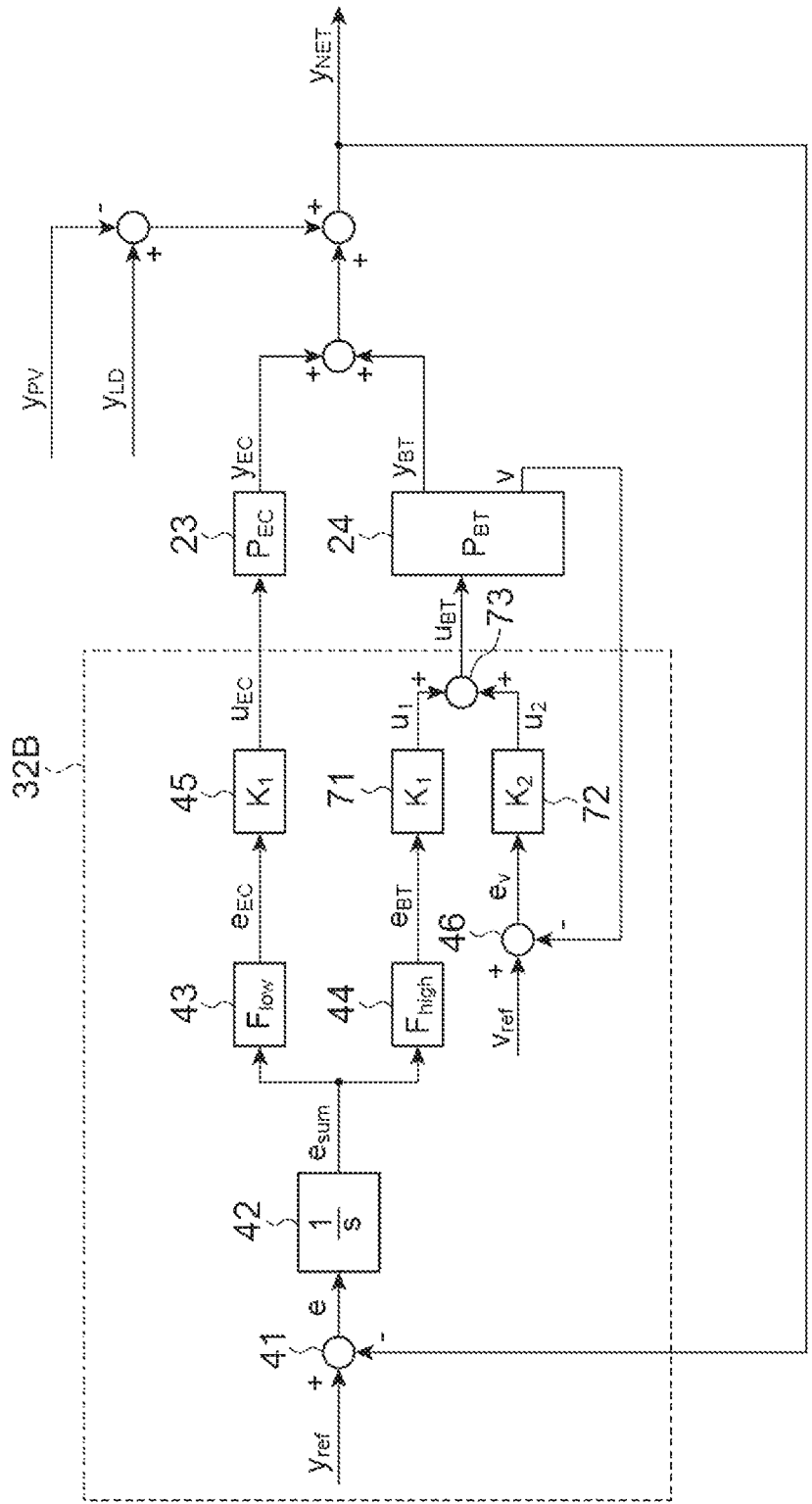
FIG. 15 is a block diagram illustrating planned value balancing control which is performed by a control unit of another modification example.

A control unit 32B shown in FIG. 15 differs mainly from the control unit 32 in that the same controller is used as the controller 45 and the controller 71. In this case, the command value $u_{EC}$ indicates electric power to be consumed by the hydrogen production system 23.

Figure 16:
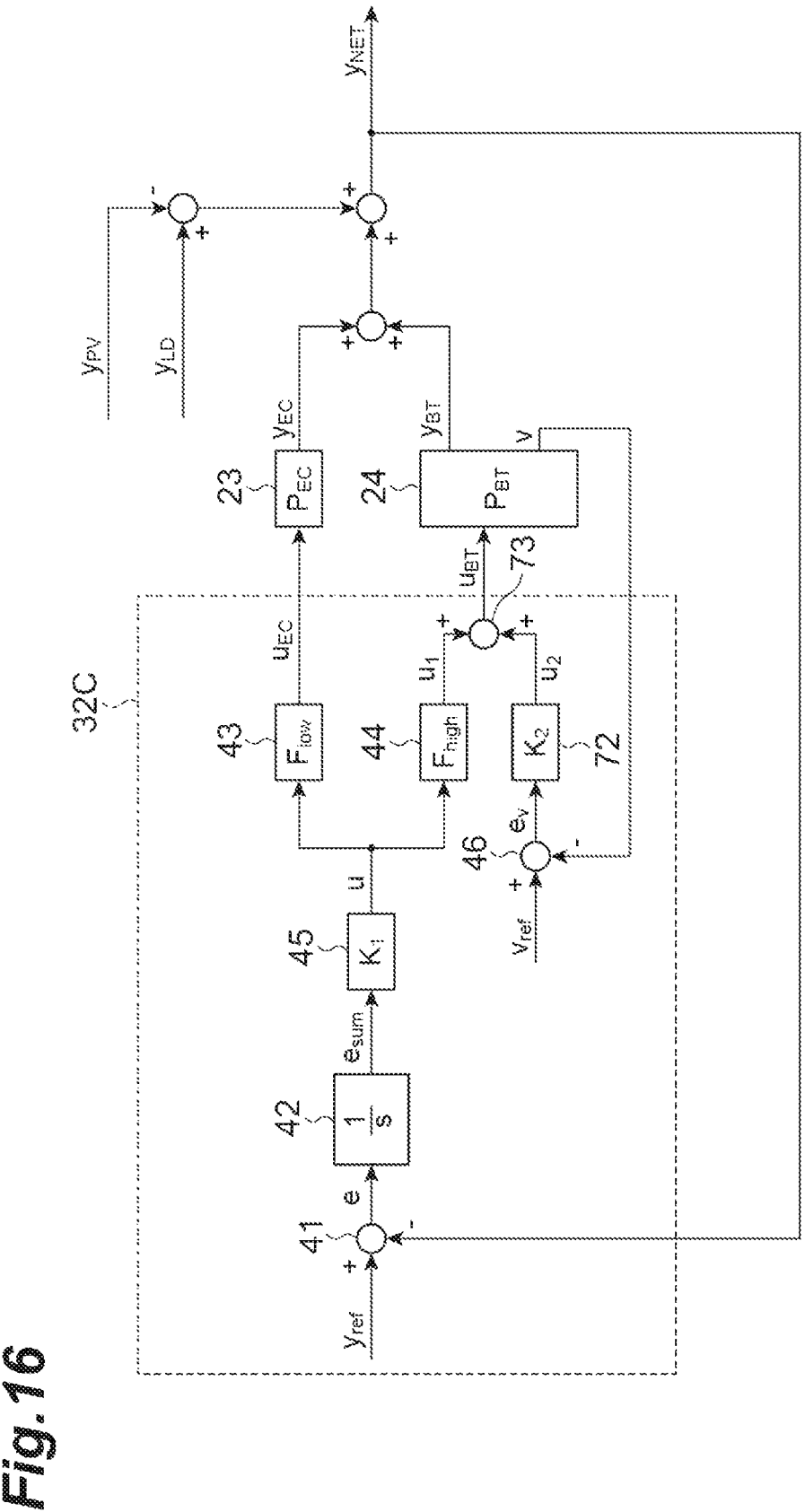
FIG. 16 is a block diagram illustrating planned value balancing control which is performed by a control unit of still another modification example.

A control unit 32C shown in FIG. 16 differs mainly from the control unit 32B in the disposition of the controller 45 and the controller 71. Specifically, in the control unit 32C, one controller 45 is disposed at the preceding stage of the low-pass filter 43 and the high-pass filter 44. In this case, the controller 45 calculates a command value u (third command value) on the basis of the integration error $e_{sum}$. The controller 45 calculates the command value u for reducing the integration error $e_{sum}$. The controller 45 calculates, for example, the command value u for making the integration error $e_{sum}$ zero. Specifically, the controller 45 receives the integration error $e_{sum}$ from the integrator 42. The controller 45 having received the integration error $e_{sum}$ outputs the command value u corresponding to the integration error $e_{sum}$ to the low-pass filter 43 and the high-pass filter 44. The low-pass filter 43 extracts a low-frequency component as the command value $u_{EC}$ from the command value u, and then outputs the command value $u_{EC}$ to the hydrogen production system 23. Similarly, the high-pass filter 44 extracts a high-frequency component as the command value $u_1$ from the command value u, and then outputs the command value $u_1$ to the adder 73. Other calculations are the same as those of the control unit 32B, and thus description thereof will be omitted.

The control unit 32C is equivalent to the control unit 32B, and thus the control unit 32C also exhibits the same effects as the control unit 32B. According to such a configuration, it is possible to reduce the number of controllers. Therefore, it is possible to reduce design and adjustment parameters.

Figure 17:
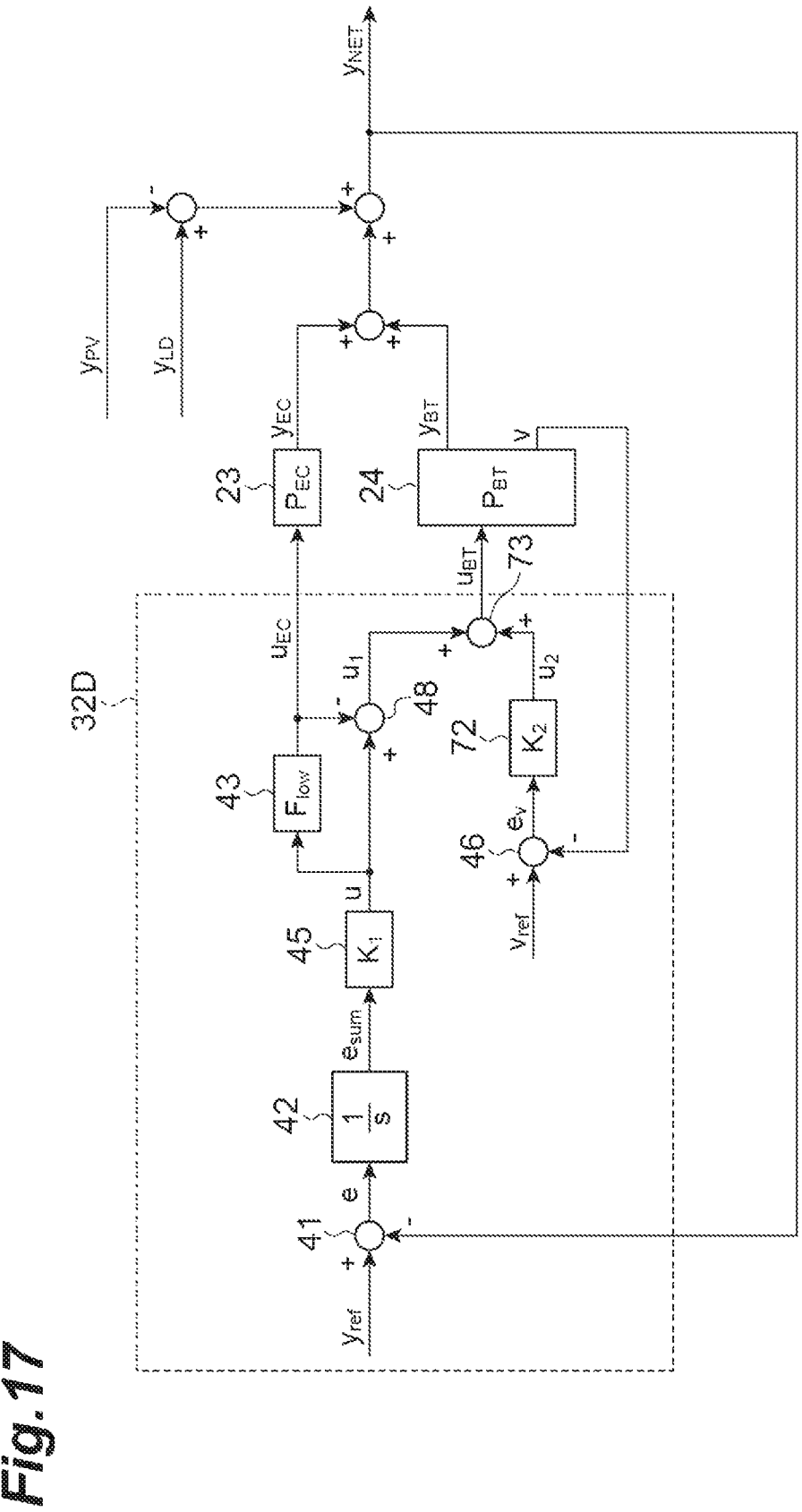
FIG. 17 is a block diagram illustrating planned value balancing control which is performed by a control unit of still another modification example.

A control unit 32D shown in FIG. 17 differs mainly from the control unit 32C in that a subtractor 48 is included instead of the high-pass filter 44. The subtractor 48 receives the command value u from the controller 45. Further, the subtractor 48 receives the command value $u_{EC}$ from the low-pass filter 43. The subtractor 48 calculates the command value $u_1$ by subtracting the command value $u_{EC}$ from the command value u. As described above, the sum of the transfer function of the low-pass filter 43 and the transfer function of the high-pass filter 44 is 1. Therefore, as shown in Expression (2), the transfer function of the high-pass filter 44 is obtained by subtracting the transfer function of the low-pass filter 43 from 1. Therefore, subtracting the command value $u_{EC}$ which is an output of the low-pass filter 43 from the command value u which is an input of the low-pass filter 43 is equivalent to passing the command value u through the high-pass filter 44.

The control unit 32D is equivalent to the control units 32B and 32C. Therefore, the control unit 32D exhibits the same effects as the control units 32B and 32C. According to such a configuration, it is possible to further reduce the number of controllers, and thus it is possible to further reduce design and adjustment parameters.

Figure 18:
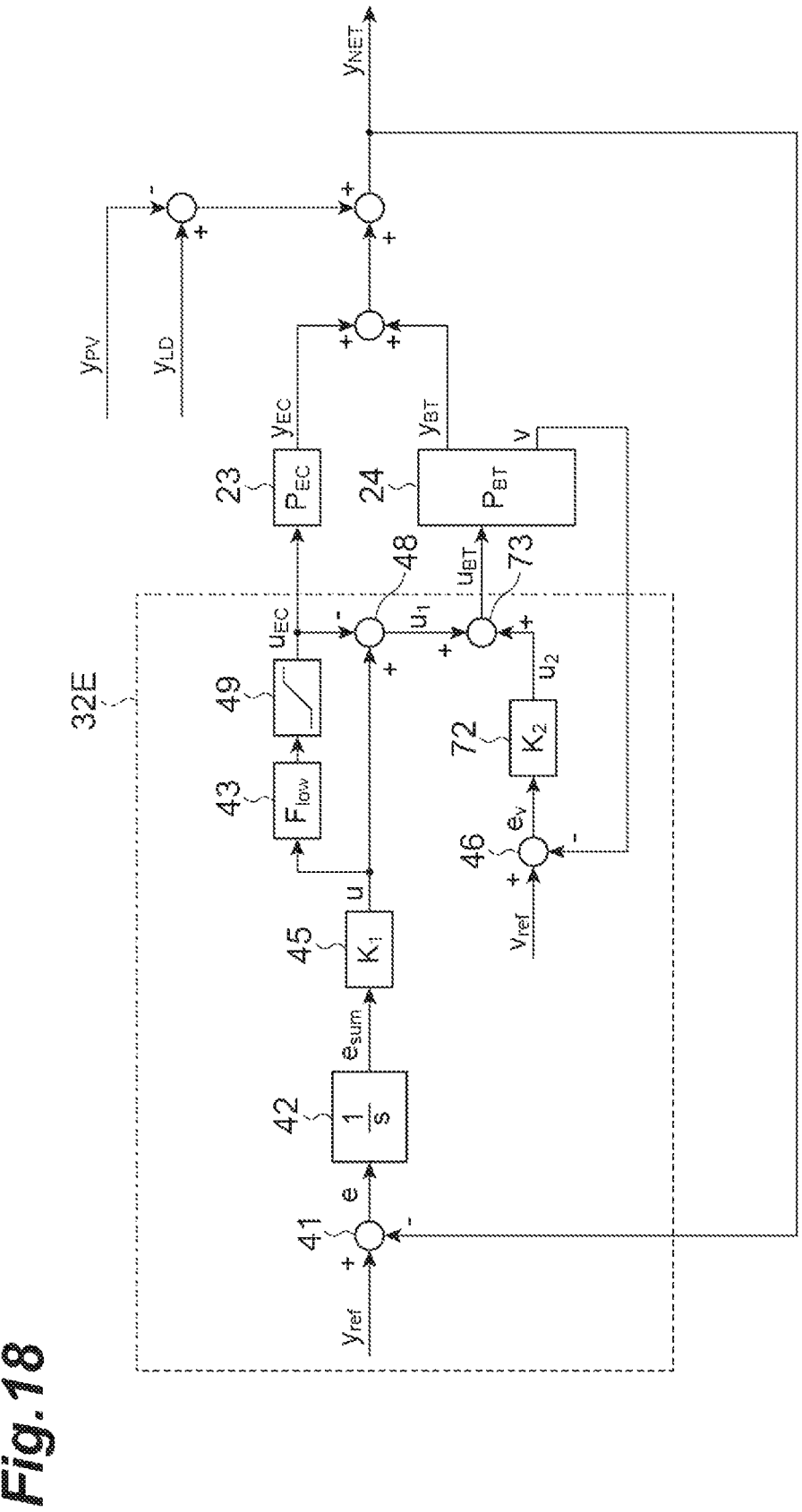
FIG. 18 is a block diagram illustrating planned value balancing control which is performed by a control unit of still another modification example.

A control unit 32E shown in FIG. 18 differs mainly from the control unit 32D in that a saturation element 49 is further included. The saturation element 49 is provided at the subsequent stage of the low-pass filter 43. The saturation element 49 receives the command value $u_{EC}$ from the low-pass filter 43. In a case where the command value $u_{EC}$ is within an effective range determined in advance, the saturation element 49 outputs the command value $u_{EC}$, as it is, to the subtractor 48 and the hydrogen production system 23. On the other hand, in a case where the command value $u_{EC}$ is outside the above effective range, the saturation element 49 changes the command value $u_{EC}$ so that the command value falls within the effective range. For example, in a case where the command value $u_{EC}$ exceeds the upper limit of the above effective range, the saturation element 49 outputs the command value $u_{EC}$ set to the upper limit. In a case where the command value $u_{EC}$ falls below the lower limit of the above effective range, the command value $u_{EC}$ set to the lower limit is output. Other calculations are the same as those of the control unit 32D, and thus description thereof will be omitted.

The hydrogen production system 23 has an effective range for the command value $u_{EC}$. For example, the hydrogen production system 23 can consume the power consumption $y_{EC}$ according to the command value $u_{EC}$ within the range of the command value $u_{EC}$ equal to or greater than 0 kW and equal to or less than 1,000 kW. The hydrogen production system 23 cannot generate electric power, and thus in a case where the command value $u_{EC}$ is a negative value, the hydrogen production system 23 cannot perform an operation according to the command value $u_{EC}$. In other words, the hydrogen production system 23 does not have discharging capability, and thus in a case where the command value $u_{EC}$ is a discharging command, the hydrogen production system 23 cannot perform the operation according to the command value $u_{EC}$. The power consumption $y_{EC}$ that can be consumed by the hydrogen production system 23 has an upper limit. For example, the content of the command value $u_{EC}$ may be a value for consuming electric power exceeding the upper limit of power consumption (for example, 1,000 kW) that can be consumed by the hydrogen production system 23. In this case, the hydrogen production system 23 cannot perform the operation according to the command value $u_{EC}$. In other words, in a case where the power to be consumed by the hydrogen production system 23 according to the command value $u_{EC}$ is outside the range of power that can be consumed by the hydrogen production system 23, the target power consumption cannot be not obtained.

On the other hand, in a case where the command value $u_{EC}$ is outside the effective range, the control unit 32E changes the command value $u_{EC}$ so that the command value falls within the effective range. Specifically, the saturation element 49 keeps the command value $u_{EC}$ within the effective range of the hydrogen production system 23. Therefore, it is possible to obtain the target power consumption.

Further, the control unit 32E generates the command value $u_{BT}$ on the basis of the command value $u_1$. The command value $u_1$ is generated by the output the saturation element 49 (the command value $u_{EC}$) being subtracted from the command value u. In other words, a difference between before and after the command value $u_{EC}$ is changed by the saturation element 49 is added to the command value $u_{BT}$. When electric power required for avoiding the imbalance of electric power is on the supply side, the output of the saturation element 49 is 0. In other words, when the command value u for avoiding the imbalance of electric power is less than 0, the command value $u_{EC}$ is 0. In this case, the output (command value u) of the controller 45 is used as it is for the command value $u_{BT}$ to the power storage system 24. In such a configuration, in a case where electric power is consumed in order to avoid the imbalance, electric power is mainly consumed by the hydrogen production system 23, and the power storage system 24 finely performs charging and discharging so as not to change the remaining amount v. On the other hand, in a case where electric power is supplied in order to avoid the imbalance, the hydrogen production system 23 is stopped, and the power storage system 24 mainly performs discharging. As described above, electric power that cannot be consumed by the hydrogen production system 23 can be consumed by the power storage system 24.

Figure 19:
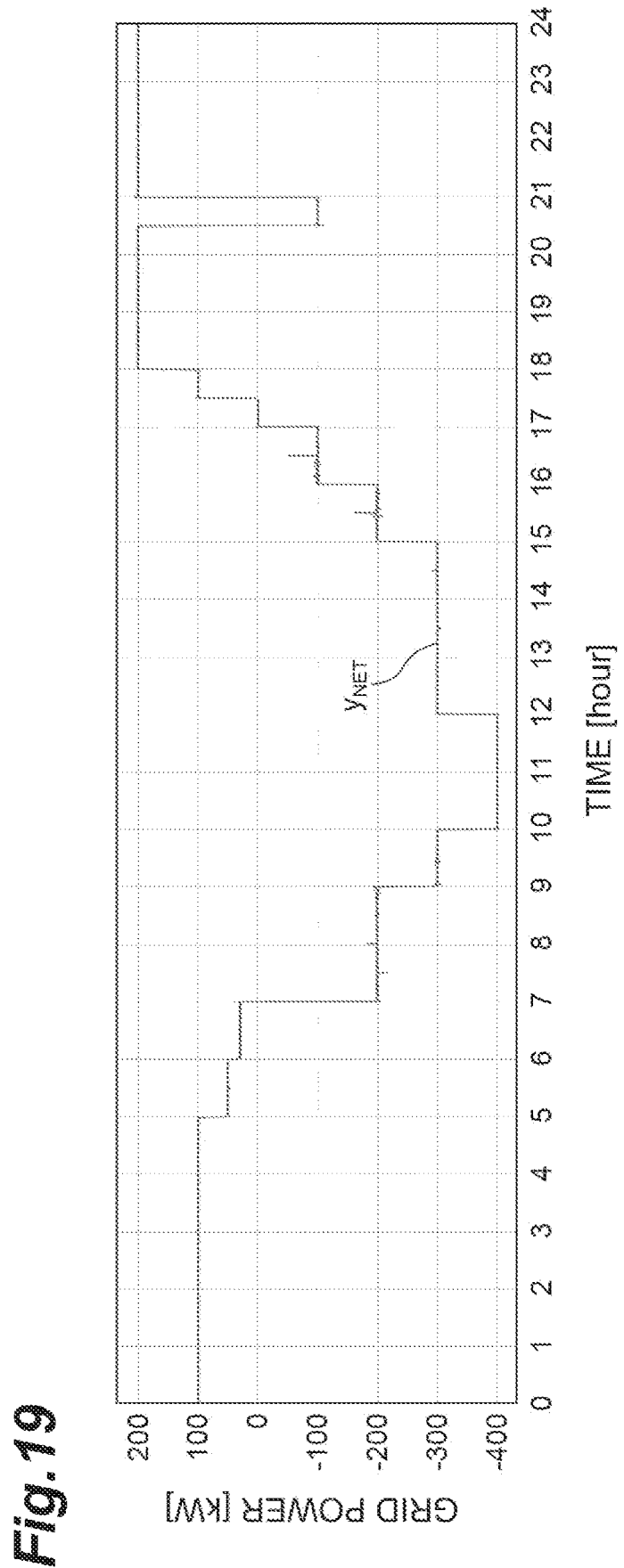
FIG. 19 is a diagram illustrating simulation results of the grid power using the control unit of FIG. 18.
Figure 20:
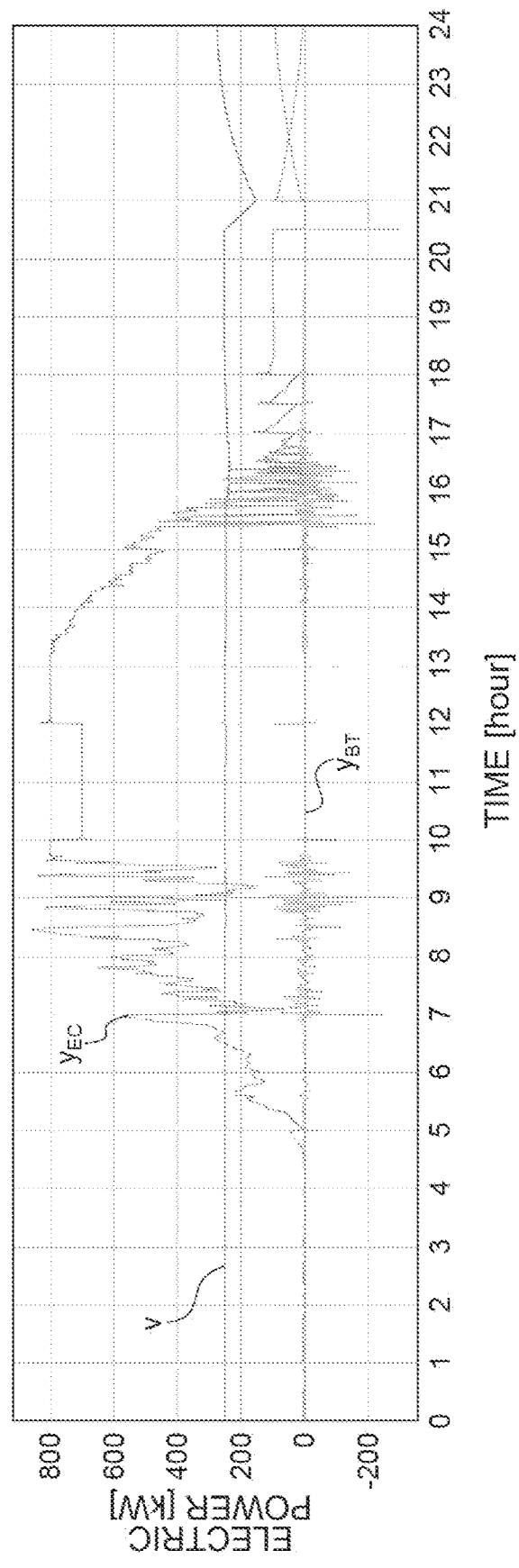
FIG. 20 is diagram illustrating simulation results of the power consumption of the hydrogen production system, the charging/discharging power of the power storage system, and the remaining amount of the power storage device using the control unit of FIG. 18.

Simulation results using the control unit 32E will be described with reference to FIGS. 19 and 20. FIG. 19 is a diagram illustrating simulation results of the grid power using the control unit of FIG. 18. FIG. 20 is a diagram illustrating simulation results of the power consumption of the hydrogen production system, the charging/discharging power of the power storage system, and the remaining amount of the power storage device using the control unit of FIG. 18. The horizontal axes of FIGS. 19 and 20 represent time from 0 o'clock to 24 o'clock. The vertical axis of FIG. 19 represents grid power (unit: kW). The vertical axis of FIG. 20 represents the power consumption $y_{EC}$ of the hydrogen production system 23 and the charging/discharging power $y_{BT}$ (unit: kW) of the power storage system 24.

In the simulation of the present disclosure, as the planned value, a value was used assuming that electric power is interchanged by demand response or the like in the 42nd planned section (from 20:30 to 21:00). Specifically, in the planned values of the grid power shown in FIG. 6, the planned value for the 42nd planned section was changed from 100.0 kWh to −50.0 kWh. The same conditions as the above simulation were used as condition excluding the planned values. In this case, as shown in FIG. 19, the measured value $y_{NET}$ is temporarily set to a negative value in the planned section from 20:30 to 21:00. That is, the microgrid 2 transmits electric power to the electric power system 90.

As described above, the hydrogen production system 23 has only the ability to adjust electric power according to power consumption. Therefore, as shown in FIG. 20, in the planned section from 20:30 to 21:00, the power consumption $y_{EC}$ of the hydrogen production system 23 is 0 kW, and the charging/discharging power $y_{BT}$ of the power storage system 24 is a negative value. That is, it can be understood that the imbalance is avoided by stopping the hydrogen production system 23 and discharging the power storage device of the power storage system 24 in the planned section. It can be understood that the remaining amount v of the power storage device of the power storage system 24 is recovered by suppressing the power consumption $y_{EC}$ of the hydrogen production system 23 after 21:00.

Figure 21:
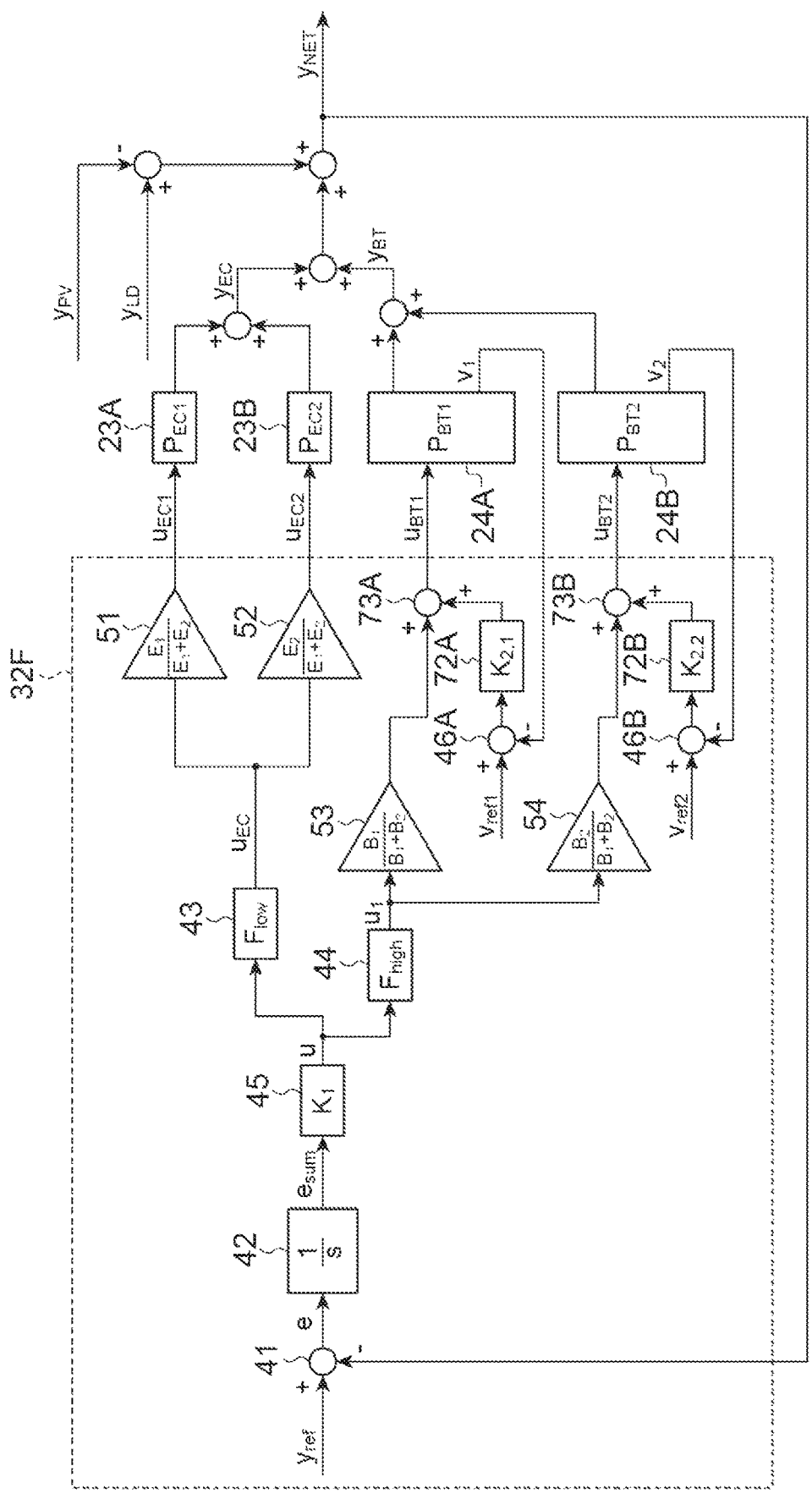
FIG. 21 is a block diagram illustrating planned value balancing control which is performed by a control unit of still another modification example.

The microgrid 2 may include a plurality of hydrogen production systems 23. The microgrid 2 may include a plurality of power storage systems 24. In the example shown in FIG. 21, the microgrid 2 includes two hydrogen production systems 23 (hydrogen production systems 23A and 23B) and two power storage systems 24 (power storage systems 24A and 24B). For the microgrid 2, the energy management system 3 includes a control unit 32F. The control unit 32F differs mainly from the control unit 32C in that proportional elements 51 to 54 are further included. Further, the control unit 32F differs mainly from the control unit 32C in that subtractors 46A and 46B, controllers 72A and 72B, and adders 73A and 73B are included instead of the subtractor 46, the controller 72, and the adder 73.

The proportional element 51 is provided at the subsequent stage of the low-pass filter 43. The proportional element 51 receives the command value $u_{EC}$ from the low-pass filter 43. The proportional element 51 multiplies the command value $u_{EC}$ by a proportional gain $K_{EC1}$. The proportional element 51 outputs the multiplication result as a command value $u_{EC1}$ to the hydrogen production system 23A. As shown in Expression (6), the proportional gain $K_{EC1}$ is, for example, the ratio of the maximum power consumption $E_1$ of the hydrogen production system 23A to the total sum of the maximum power consumption $E_1$ of the hydrogen production system 23A and the maximum power consumption $E_2$ of the hydrogen production system 23B.

[Expression 6]

$$K_{EC1} = \frac{E_1}{E_1 + E_2} \quad (6)$$

The proportional element 52 is provided at the subsequent stage of the low-pass filter 43. The proportional element 52 receives the command value $u_{EC}$ from the low-pass filter 43. The proportional element 52 multiplies the command value $u_{EC}$ by a proportional gain $K_{EC2}$. The proportional element 52 outputs the multiplication result as a command value $u_{EC2}$ to the hydrogen production system 23B. As shown in Expression (7), the proportional gain $K_{EC2}$ is, for example, the ratio of the maximum power consumption $E_2$ of the hydrogen production system 23B to the total sum of the maximum power consumption $E_1$ of the hydrogen production system 23A and the maximum power consumption $E_2$ of the hydrogen production system 23B.

[Expression 7]

$$K_{EC2} = \frac{E_2}{E_1 + E_2} \quad (7)$$

The proportional element 53 is provided at the subsequent stage of the high-pass filter 44. The proportional element 53 receives the command value $u_1$ from the high-pass filter 44. The proportional element 53 multiplies the command value $u_1$ by a proportional gain $K_{BT1}$. The proportional element 53 outputs the multiplication result to the adder 73A. As shown in Expression (8), the proportional gain $K_{BT1}$ is, for example, the ratio of the maximum charging/discharging power $B_1$ of the power storage system 24A to the total sum of the maximum charging/discharging power $B_1$ of the power storage system 24A and the maximum charging/discharging power $B_2$ of the power storage system 24B.

[Expression 8]

$$K_{BT1} = \frac{B_1}{B_1 + B_2} \quad (8)$$

The proportional element 54 is provided at the subsequent stage of the high-pass filter 44. The proportional element 54 receives the command value $u_1$ from the high-pass filter 44. The proportional element 54 multiplies the command value $u_1$ by a proportional gain $K_{BT2}$. The proportional element 54 outputs the multiplication result to the adder 73B. As shown in Expression (9), the proportional gain $K_{BT2}$ is, for example, the ratio of the maximum charging/discharging power $B_2$ of the power storage system 24B to the total sum of the maximum charging/discharging power $B_1$ of the power storage system 24A and the maximum charging/discharging power $B_2$ of the power storage system 24B.

[Expression 9]

$$K_{BT2} = \frac{B_2}{B_1 + B_2} \quad (9)$$

The subtractor 46A receives a remaining amount $v_1$ of the power storage device included in the power storage system 24A from the power storage system 24A. The subtractor 46A calculates an error by subtracting the remaining amount $v_1$ from a target value $v_{ref1}$. The subtractor 46A outputs the error to the controller 72A. The target value $v_{ref1}$ is a target value of the remaining amount of the power storage device included in the power storage system 24A. The controller 72A receives an error from the subtractor 46A. The controller 72A outputs a command value corresponding to the error to the adder 73A. The controller 72A calculates a command value for reducing the error. The controller 72A calculates, for example, a command value for making the error zero. The controller 72A is, for example, a PID controller. The adder 73A calculates a command value $u_{BT1}$ by adding the multiplication result received from the proportional element 53 and the command value received from the controller 72A. The adder 73A then outputs the command value $u_{BT1}$ to the power storage system 24A.

The subtractor 46B receives a remaining amount $v_2$ of the power storage device included in the power storage system 24B from the power storage system 24B. The subtractor 46B calculates an error by subtracting the remaining amount $v_2$ from a target value $v_{ref2}$. The subtractor 46B outputs the error to the controller 72B. The target value $v_{ref}$ is a target value of the remaining amount of the power storage device included in the power storage system 24B. The controller 72B receives an error from the subtractor 46B. The controller 72B outputs a command value corresponding to the error to the adder 73B. The controller 72B calculates a command value for reducing the error. The controller 72B calculates, for example, a command value for making the error zero. The controller 72B is, for example, a PID controller. The adder 73B calculates a command value $u_{BT2}$ by adding the multiplication result received from the proportional element 54 and the command value received from the controller 72B. The adder 73B then outputs the command value $u_{BT2}$ to the power storage system 24B.

The proportional elements 51 and 52 cause the hydrogen production systems 23A and 23B to share a load corresponding to the maximum power consumption of the hydrogen production systems 23A and 23B. Even in a case where the microgrid 2 includes three or more hydrogen production systems 23, the proportional elements similarly cause each hydrogen production system 23 to share a load corresponding to the maximum power consumption of each hydrogen production system 23. The proportional elements 53 and 54 cause the power storage systems 24A and 24B to share a load corresponding to the maximum charging/discharging power of the power storage systems 24A and 24B. Even in a case where the microgrid 2 includes three or more power storage systems 24, the proportional elements similarly cause each power storage system 24 to share a load corresponding to the maximum charging/discharging power of each power storage system 24.

Figure 22:
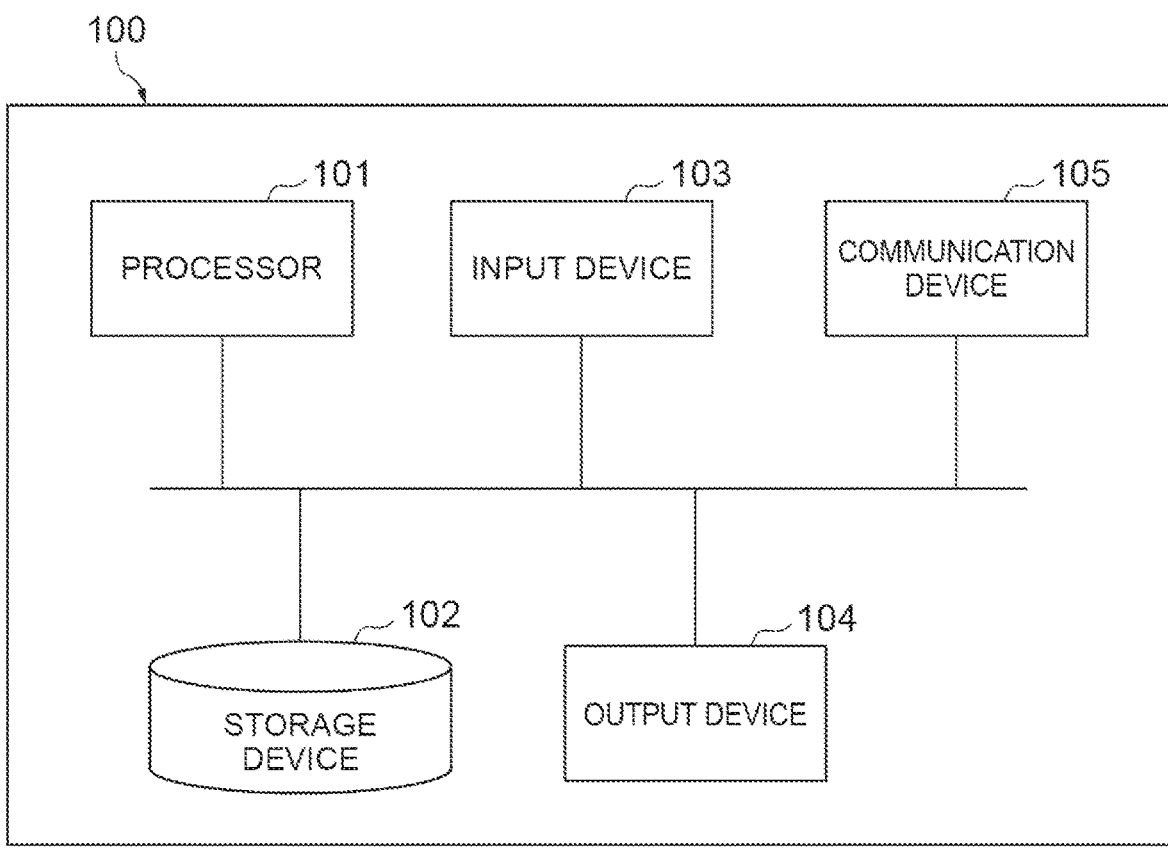
FIG. 22 is a diagram illustrating an example of a hardware configuration of the energy management system shown in FIG. 1.

Next, a hardware configuration of the energy management system 3 will be described with reference to FIG. 22. FIG. 22 is a diagram illustrating an example of a hardware configuration of the energy management system shown in FIG. 1. The energy management system 3 includes one or a plurality of computers 100. The computer 100 includes a processor 101, a storage device 102, an input device 103, an output device 104, and a communication device 105. The energy management system 3 is constituted by one or a plurality of computers 100 composed of these hardware and software such as programs. That is, the energy management system 3 includes at least one processor 101.

In a case where the energy management system 3 is constituted by a plurality of computers 100, these computer 100 may be locally connected to each other. These computers 100 may be connected to each other through a communication network such as the Internet or an intranet. One energy management system 3 is logically constructed through this connection.

The processor 101 executes an operating system, application programs, and the like. An example of the processor 101 is a central processing unit (CPU). The storage device 102 includes a main storage device constituted by a read only memory (ROM) and a random access memory (RAM), and an auxiliary storage device constituted by a hard disk, a flash memory, and the like. The input device 103 is constituted by a keyboard, a mouse, a touch panel, a microphone for voice input, and the like. The output device 104 is constituted by a display, a printer, and the like. The communication device 105 is constituted by a network card or a wireless communication module.

The storage device 102 stores a program for causing the computer 100 to function as the energy management system 3 and data necessary for processing. Each function of the energy management system 3 shown in FIG. 2 is realized by causing hardware such as the processor 101 to read a program to bring each piece of hardware into operation under control of the processor 101, and reading out and writing data in the storage device 102.

The program may be provided after being recorded on a tangible recording medium such as, for example, a CD-ROM, a DVD-ROM, and a semiconductor memory. The program may be provided as a data signal through a communication network.

The adjustable power supply for eliminating the imbalance is mainly thermal power generation. In order to eliminate the imbalance, it is necessary to keep multiple units of the adjustable power supply in a starting state and to perform a partial output operation with a margin for both raising and lowering. This operation is not desirable from the viewpoint of the efficiency of power generation. This operation may lead to an increase in the unit price of power generation, an increase in $CO_2$ emissions, and the like. Therefore, the suppression or elimination of the imbalance is not limited to the economics and profitability of a specific microgrid. The suppression or elimination of the imbalance is also related to the economic energy supply and the reduction of the environmental load of society as a whole. Thus, the power adjustment method and the power adjustment device of the present disclosure contributes to Goal 7 "Ensure access to affordable, reliable, sustainable and modern energy for all" and Goal 13 "Take urgent action to combat climate change and its impacts" among Sustainable Development Goals (SDGs) led by the United Nations.

Hydrogen is attracting attention as a next-generation energy source. In particular, hydrogen produced using a method of considerably reducing $CO_2$ emissions is referred to as "$CO_2$-free hydrogen." The power adjustment method and the power adjustment device of the present disclosure make it possible to produce hydrogen using surplus power of renewable energy, and thus contribute to the production of $CO_2$-free hydrogen. The power adjustment method and the power adjustment device of the present disclosure demonstrate a control method of suppressing variability which is a problem with renewable energy power supplies. That is, the power adjustment method and the power adjustment device of the present disclosure also contribute to the popularization and expansion of renewable energy power supplies themselves. Therefore, the power adjustment method and the power adjustment device of the present disclosure contribute to Goal 7.2 "By 2030, increase substantially the share of renewable energy in the global energy mix" and Goal 9.3 "By 2030, upgrade infrastructure and retrofit industries to make them sustainable, with increased resource-use efficiency and greater adoption of clean and environmentally sound technologies and industrial processes, with all countries taking action in accordance with their respective capabilities" among SDGs.

The power adjustment method and the power adjustment device of the present disclosure are suitable for a planned value balancing system through the electric power market. Further, planned value balancing control is a necessary technique in other systems as well. For example, even in self-consignment in which companies and the like use the power transmission and distribution networks of general electric utilities, the power transmission side and the power reception side may be subject to the planned value balancing constraint. Even in the case of self-consignment, the present technique can be used to control the amount of the grid power in a certain section to a target value.

Incidentally, in recent years, attention has been focused on an international initiative in which companies aim to use 100% renewable energy for their business operations, which is called RE100. Generally, high-rise buildings in urban areas where corporate headquarters are located do not have enough space to install photovoltaic power generation facilities and wind power generation facilities to compensate for energy consumption of the entire building. Therefore, as one of measures to realize RE100, self-consignment from renewable energy power generation facilities existing in various areas to high-rise buildings such as headquarters can be considered. In the self-consignment system, both the power transmission side and the power reception side have to comply with the planned value balancing, and thus the application of the technique of the present disclosure is expected. Therefore, the present disclosure also contributes to the promotion of RE100.

REFERENCE SIGNS LIST

1 Power supply system
2 Microgrid
3 Energy management system
90 Electric power system
21 Power generation system
22 Electric power consumer
23, 23A, 23B Hydrogen production system (power consuming device)
24, 24A, 24B Power storage system (power storage device)
25 Grid control unit
26 Power measurement unit
27 Power measurement unit
31 Communication unit
32, 32A, 32B, 32C, 32D, 32E, 32F Control unit
100 Computer
101 Processor
e Error
$e_{BT}$ High-frequency component
$e_{EC}$ Low-frequency component
$e_{sum}$ Integration error
$e_v$ Error
St Target trajectory
Sr Integrated value
u Command value (third command value)
$u_{BT}$ Command value (second command value)
$u_{EC}$ Command value (first command value)
v Remaining amount
$v_{ref}$ Target value
$y_{BT}$ Charging/discharging power
$y_{EC}$ Power consumption
$y_{LD}$ Power consumption
$y_{NET}$ Measured value
$y_{PV}$ Generated power
$v_{ref}$ Target value (power target value)

The invention claimed is:

1. A power adjustment method of controlling power consumption of a power consuming device and charging/discharging power of a power storage device included in a microgrid capable of transmitting and receiving electric power to and from an external electric power system, the method comprising:
  a step of calculating an integration error which is an error between a control target value of an integrated amount of grid power transmitted and received between the electric power system and the microgrid and an actual value of the integrated amount of the grid power;
  a step of generating a first command value for causing the power consuming device to consume the power on the basis of a low-frequency component of the integration error;
  a step of generating a second command value for causing the power storage device to charge and discharge the charging/discharging power on the basis of a high-frequency component of the integration error; and
  a step of outputting the first command value to the power consuming device and outputting the second command value to the power storage device.

2. The power adjustment method according to claim 1, wherein the step of calculating an integration error includes
  a step of calculating an error between a power target value of the grid power and a measured value of the grid power, and
  a step of calculating the integration error by integrating the error.

3. The power adjustment method according to claim 1, wherein the step of calculating an integration error includes
  a step of calculating the actual value by integrating a measured value of the grid power, and
  a step of calculating the integration error by calculating a difference between the control target value and the actual value.

4. The power adjustment method according to claim 1, wherein the step of generating a second command value includes generating the second command value on the basis of an error between a target value of a remaining amount of the power storage device and the remaining amount, and the high-frequency component.

5. The power adjustment method according to claim 1, wherein the control target value increases at a constant rate as time passes in a time interval.

6. The power adjustment method according to claim 1, wherein a rate of increase in the control target value changes continuously from a previous time interval.

7. The power adjustment method according to claim 1, further comprising a step of, in a case where the first command value is outside a range determined in advance, changing the first command value so as to fall within the range and adding a difference before and after the change to the second command value.

8. The power adjustment method according to claim 1, further comprising a step of generating a third command value on the basis of the integration error,
wherein the step of generating a first command value includes generating the first command value on the basis of a low-frequency component of the third command value, and
the step of generating a second command value includes generating the second command value on the basis of a high-frequency component of the third command value.

9. A power adjustment device configured to control power consumption of a power consuming device and charging/discharging power of a power storage device included in a microgrid capable of transmitting and receiving electric power to and from an external electric power system, the device comprising at least one processor,
wherein the at least one processor
calculates an integration error which is an error between a control target value of an integrated amount of grid power transmitted and received between the electric power system and the microgrid and an actual value of the integrated amount of the grid power,
generates a first command value for causing the power consuming device to consume the power on the basis of a low-frequency component of the integration error,
generates a second command value for causing the power storage device to charge and discharge the charging/discharging power on the basis of a high-frequency component of the integration error, and
outputs the first command value to the power consuming device and outputting the second command value to the power storage device.

10. A power adjustment method of controlling power consumption of a power consuming device and charging/discharging power of a power storage device included in a microgrid capable of transmitting and receiving electric power to and from an external electric power system, the method comprising:
a step of calculating an error between a control target value of grid power transmitted and received between the electric power system and the microgrid and an actual value of the grid power;
a step of generating a first command value for causing the power consuming device to consume the power on the basis of a low-frequency component of the error;
a step of generating a second command value for causing the power storage device to charge and discharge the charging/discharging power on the basis of a high-frequency component of the error; and
a step of outputting the first command value to the power consuming device and outputting the second command value to the power storage device.

* * * * *